(12) United States Patent
    Raina

(10) Patent No.: US 11,151,419 B1
(45) Date of Patent: Oct. 19, 2021

(54) DATA SEGMENTATION USING MACHINE LEARNING

(71) Applicant: WARPSPEED, Inc, Pleasanton, CA (US)

(72) Inventor: Abnesh Raina, Pleasanton, CA (US)

(73) Assignee: WARPSPEED, Inc., Pleasanton, CA (US)

( * ) Notice: Subject to any disclaimer, the term of this patent is extended or adjusted under 35 U.S.C. 154(b) by 0 days.

(21) Appl. No.: 17/226,800

(22) Filed: Apr. 9, 2021

(51) Int. Cl.
    *G06K 9/00*     (2006.01)
    *G06K 9/62*     (2006.01)
    *G06N 20/00*     (2019.01)
    *G06N 7/00*     (2006.01)

(52) U.S. Cl.
    CPC ........... *G06K 9/6261* (2013.01); *G06K 9/622* (2013.01); *G06K 9/623* (2013.01); *G06N 7/005* (2013.01); *G06N 20/00* (2019.01)

(58) Field of Classification Search
    CPC ...... G06K 9/38; G06K 9/4652; G06K 9/6261; G06K 9/622; G06T 5/40; G06T 7/0081; G06T 7/0083; G06T 7/408; G06T 2207/20148; G06T 2207/20144; G06T 2207/10016; G06T 2207/10024; H04N 1/403; G06F 17/30243
    See application file for complete search history.

(56) References Cited

U.S. PATENT DOCUMENTS

| | | | |
|---|---|---|---|
| 6,954,544 B2 * | 10/2005 | Jepson | G06K 9/32 348/155 |
| 7,340,408 B1 | 3/2008 | Drew et al. | |
| 8,171,030 B2 * | 5/2012 | Pereira | G06T 7/12 707/741 |
| 8,265,393 B2 * | 9/2012 | Tribelhorn | G06T 7/194 382/173 |
| 8,744,898 B1 | 6/2014 | Hewett et al. | |
| 9,129,290 B2 | 9/2015 | Kannan et al. | |
| 9,251,594 B2 * | 2/2016 | Lin | G06T 7/00 |
| 9,792,630 B2 * | 10/2017 | Kang | G06Q 30/0275 |
| 10,136,266 B2 * | 11/2018 | Ahmad | H04W 64/00 |
| 10,885,514 B1 | 1/2021 | Hart et al. | |
| 10,997,515 B2 * | 5/2021 | Khidekel | G06Q 30/0201 |
| 2006/0111977 A1 | 5/2006 | Hawkins | |
| 2006/0143071 A1 | 6/2006 | Hofmann | |
| 2007/0100679 A1 | 5/2007 | Wollan et al. | |

(Continued)

OTHER PUBLICATIONS

"U.S. Appl. No. 17/226,536, Non Final Office Action dated Jun. 9, 2021", 8 pgs.

(Continued)

*Primary Examiner* — Amir Alavi

(74) *Attorney, Agent, or Firm* — Schwegman Lundberg & Woessner, P.A.

(57) ABSTRACT

Disclosed are systems, methods, and non-transitory computer-readable media for data segmentation using machine learning. A data segmentation system prioritizes parameters used for segmenting data into predetermined categories. For example, the data segmentation system uses linear regression to determine signal strength values for the individual parameters. The signal strength values can be used to automatically select a set of parameters for segmenting data, determine weights for the parameters and/or determine threshold segmentation values.

17 Claims, 18 Drawing Sheets

(56) References Cited

U.S. PATENT DOCUMENTS

| | | | |
|---|---|---|---|
| 2008/0140577 A1* | 6/2008 | Rahman | G06Q 20/3829 |
| | | | 705/71 |
| 2010/0301114 A1 | 12/2010 | Lo et al. | |
| 2011/0106607 A1 | 5/2011 | Alfonso et al. | |
| 2011/0197140 A1* | 8/2011 | Seeger | G06Q 10/107 |
| | | | 715/739 |
| 2011/0208585 A1 | 8/2011 | Daboll et al. | |
| 2011/0251874 A1 | 10/2011 | Banthia et al. | |
| 2012/0084812 A1 | 4/2012 | Thompson et al. | |
| 2012/0173250 A1 | 7/2012 | Jeffrey et al. | |
| 2013/0218677 A1 | 8/2013 | Yopp et al. | |
| 2014/0278798 A1 | 9/2014 | Goyal et al. | |
| 2014/0278967 A1 | 9/2014 | Pal et al. | |
| 2015/0220999 A1 | 8/2015 | Thornton et al. | |
| 2015/0334458 A1 | 11/2015 | Srinivasan et al. | |
| 2016/0260113 A1 | 9/2016 | Simpson | |
| 2018/0060885 A1 | 3/2018 | Elmachtoub et al. | |
| 2018/0218376 A1 | 8/2018 | Shen et al. | |
| 2018/0268319 A1 | 9/2018 | Guo et al. | |
| 2018/0300748 A1* | 10/2018 | Flaks | G06Q 30/0243 |
| 2019/0019213 A1 | 1/2019 | Silberman et al. | |
| 2019/0080362 A1 | 3/2019 | Acuna Agost et al. | |
| 2019/0171957 A1* | 6/2019 | Yang | G06Q 30/0202 |
| 2019/0180302 A1 | 6/2019 | Ventrice et al. | |
| 2019/0180303 A1 | 6/2019 | Ventrice et al. | |
| 2019/0272557 A1 | 9/2019 | Smith et al. | |
| 2019/0335006 A1 | 10/2019 | George et al. | |
| 2020/0126100 A1 | 4/2020 | Goyal et al. | |
| 2020/0142930 A1 | 5/2020 | Wang et al. | |
| 2020/0293923 A1 | 9/2020 | Zhu et al. | |
| 2020/0357026 A1 | 11/2020 | Liu | |

OTHER PUBLICATIONS

"U.S. Appl. No. 17/226,536, Response filed Jun. 11, 2021 to Non Final Office Action dated Jun. 9, 2021", 11 pages.

"U.S. Appl. No. 17/226,926, Non Final Office Action dated Jun. 18, 2021", 17 pgs.

"U.S. Appl. No. 17/226,955, Non Final Office Action dated Jun. 11, 2021".

Aziz, Andrew, "Customer Segmentation based on Behavioral Data in E-marketplace", (Aug. 2017), pp. 1-42.

Cabena, Peter, et al., "Intelligent Miner for Data Applications Guide", (Mar. 1999), pp. 1-175.

Chen, Jenny, "Retail Customer Segmentation using SAS", (Apr. 2014), pp. 1-19.

Chen, Sien, "Estimating Customer Lifetime Value Using Machine Learning Techniques—Chapter 2", (2018), pp. 1-19.

Kim, Su-Peon, et al., "Customer segmentation and strategy development based on customer lifetime value: A case study", (2006), 101-107.

Lemon, Katherine, "(Abstract) Customer Lifetime Value as the Basis of Customer Segmentation: Issues and Challenges (Abstract)", Journal of Relationship Marketing, vol. 5, Issue 2-3, (2008), 1 pg.

Martin, Ronan, "Using Customer Lifetime Value as a Segmentation Strategy", (Jan. 3, 2019), 7 pgs.

Mejia, Nicocolo, "AI for Customer Segmentation and Marketing Campaigns", (Apr. 30, 2018), 8 pgs.

Teichmann, Jan, "AI meets marketing segmentation models", TowardsDataScience.com, (Jul. 15, 2019), 19 pgs.

* cited by examiner

DATA SEGMENTATION USING MACHINE LEARNING

TECHNICAL FIELD

An embodiment of the present subject matter relates generally to data segmentation and, more specifically, to data segmentation using machine learning.

BACKGROUND

Data segmentation is commonly used when analyzing data. As part of this process, data is segmented to into various categories to derive insights related to the specific category. For example, data may be segmented based on the source of the data to derive insights pertaining to each data source, as well as compare the data sources to each other. As another example, data may be segmented based on the time at which the data was collected to derive insights pertaining to each particular time range and how they relate to each other.

Currently, data segmentation is performed manually. For example, a user manually selects the parameters for segmenting data into categories, such as by selecting time ranges, data sources, etc. This process is not only slow and inefficient, but also dependent on the judgment of the user to derive insights from the data. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
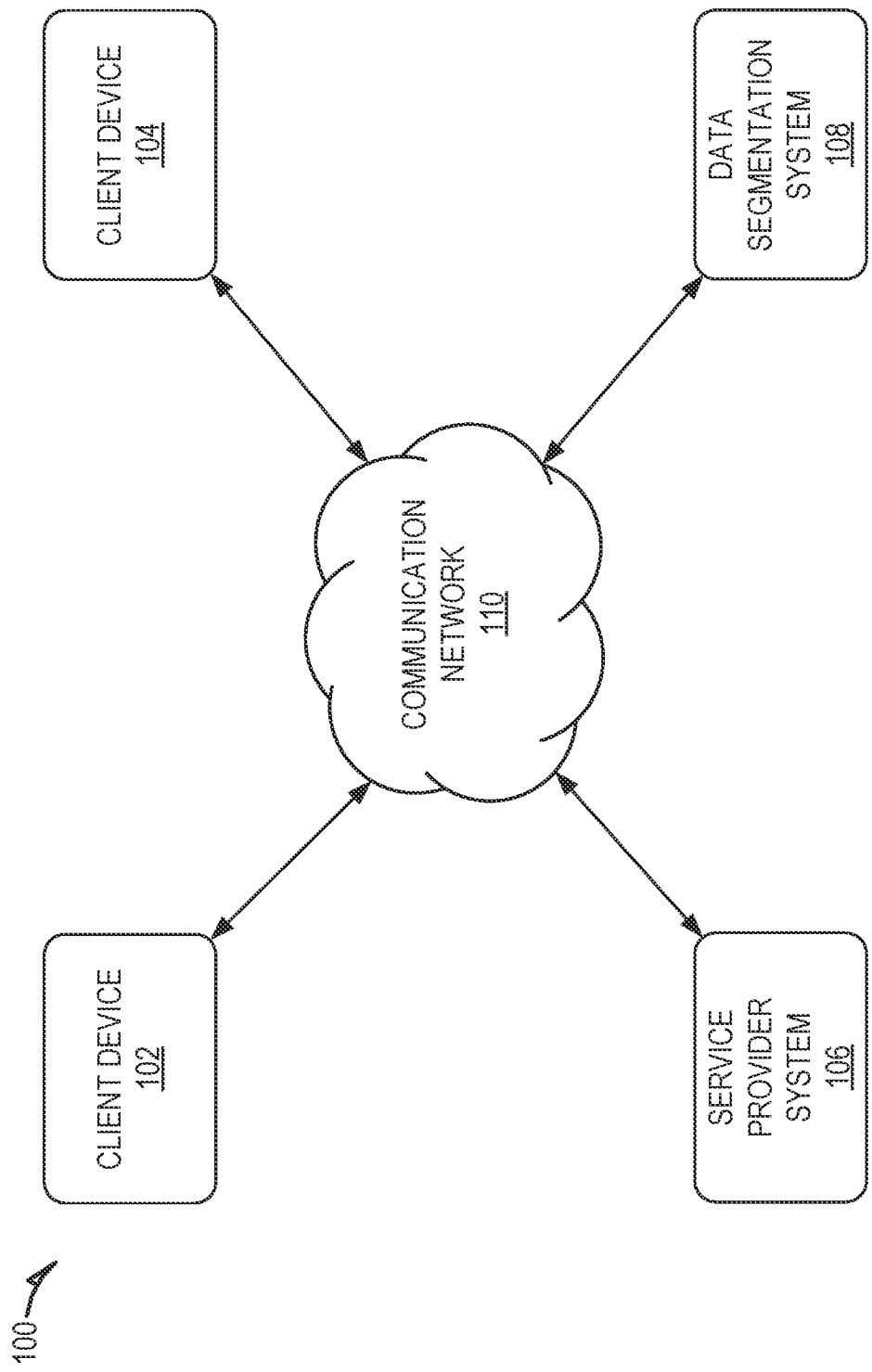
FIG. 1 shows a system for data segmentation using machine learning, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for data segmentation using machine learning. A data segmentation system provides for predictive data segmentation of data using machine learning models generated from training data describing users and/or inventory items. The training data describing each user and/or inventory item is comprised of a set of parameter values corresponding to a set of parameters. The training data is initially segmented into a set of predetermined categories. The data segmentation system uses linear regression to analyze the sets of parameter values included in each of the categories to determine a signal strength value for each individual parameter at predicting the categorization of the data (e.g., user or inventory item) into one of the predetermined categories. For example, parameters determined to be a strong signal of the proper categorization of the data may be assigned a relatively high signal strength value, whereas, parameters determined to be a weak signal of the proper categorization of the data may be assigned a relatively lower signal strength value.

The data segmentation system ranks the parameters based on the determined signal strength values, such as by ranking the parameters from the parameter with the highest signal strength value to the parameter with the lowest signal strength value. The data segmentation system uses the ranking to select a subset of the parameter to use in segmenting data into the predetermined categories, such as by selection the parameters that provide the strongest signal for predicting the categorization of the data.

The data segmentation system may also determine weights to assign to the various parameters based on the ranking. For example, parameters with a relatively higher signal strength value may be given greater weight that parameters with a relatively lower signal strength value.

The data segmentation system uses the ranking of the parameters along with the sets of parameter values included in the training data to determine threshold segmentation values used for segmenting data into the predetermined categories. For example, the data segmentation system calculates a set of averaged parameter values based on the set of parameter values included in each category. The data segmentation system may then apply weights to the averaged parameters values based on the ranking of the parameters. For example, parameters determined to have a higher signal strength value are given greater weight than parameters having a lower signal strength value.

The data segmentation system uses the resulting weighed averaged parameter values to determine threshold segmentation values for segmenting data into the predetermined categories. The threshold segmentation values define an upper and/or lower limit of a segmentation value range associated with each category.

The data segmentation system uses the threshold segmentation values to automatically segment data into one of the categories. For example, the data segmentation system determines a segmentation value based on a set of parameter values describing a user and/or inventory item and then assigns the user and/or inventory item to one of the categories based on the segmentation value range encompassing the segmentation value.

The functionality of the data segmentation system can be used to segment any of a variety of types of data, such as data representing users, inventory items, and the like. Further, the data segmentation system may be used to segment data into any desired type of category, such as predicting a customer value level, customer purchasing type, customer loyalty level, item popularity, and the like. The data segmentation system may also derive correlations between the segmented data, such as by identifying correlation and/or affinities between segments of users and items. The segmentation and determined correlations may be used to provide customized interactions/engagement with users, generate personalized recommendations, generate personalized offers, and the like.

FIG. 1 shows a system 100 for data segmentation using machine learning, according to some example embodiments. As shown, multiple devices (i.e., client device 102, client device 104, service provider system 106, and data segmentation system 108) are connected to a communication network 110 and configured to communicate with each other through use of the communication network 110. The communication network 110 is any type of network, including a local area network (LAN), such as an intranet, a wide area network (WAN), such as the internet, a telephone and mobile device network, such as cellular network, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1800 shown in FIG. 18.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The service provider system 106 is one or more computing devices associated with a service provider that utilizes the functionality of the data segmentation system 108. A service provider may be a person, business, company, and/or any other type of entity that uses the services provided by the data segmentation system 108.

The service provider may use the functionality of the data segmentation system 108 as part of a service provided by the service provider. The service provider may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The service provider system 106 may facilitate any service of a service provider that is provided online, such as a ride-sharing service, reservation service, retail service, news service, and the like. In these types of embodiments, users (e.g., customers of the service provider) may interact with the service provider system 106 to utilize the online service provided by the service provider. Users communicate with and utilize the functionality of the service provider system 106 by using the client devices 102 and 104 that are connected to the communication network 110 by direct and/or indirect communication. The service provider system 106, however, does not have to provide an online service that is accessible to users. That is, the service provider system 106 may simply be a computing system used by a service provider to perform any type of functionality, such as manage inventory, maintain transaction data, maintain customer records, and the like.

Although the shown system 100 includes only two client devices 102, 104 and one service provider system 106, this is only for ease of explanation and is not meant to be limiting. The system 100 can include any number of client devices 102, 104 and/or service provider systems 106. Further, each service provider system 106 may concurrently accept communications from and/or interact with any number of client devices 102, 104, and support connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with a service provider system 106 via a client-side application installed on the client devices 102 and 104. In some embodiments, the client-side application includes a component specific to the service provider system 106. For example, the component may be a stand-alone application, one or more application plug-ins, and/or a browser extension. However, users may also interact with the service provider system 106 via a third-party application, such as a web browser or messaging application, that resides on the client devices 102 and 104 and is configured to communicate with the service provider system 106. In either case, the client-side application presents a user interface (UI) for the user to interact with the service provider system 106. For example, the user interacts with the service provider system 106 via a client-side application integrated with the file system or via a webpage displayed using a web browser application.

The data segmentation system 108 provides data segmentation functionality for service providers. A service provider may utilize data segmentation for a variety of reasons, such as to analyze data, identify correlations between data, implement personalized engagement with users, generate personalized recommendations, generate personalized offers/promotions, and the like.

As an example, a service provider providing a retail service may use data segmentation to better understand and engage with their users (e.g., customers). For example, the service provider may segment the users into categories indicating a value level of the user to the service provider (e.g., high value, medium value, low value). The service provider may then engage with the users in a personalized manner based on the segmentation. For example, the service provider may provide different incentives or promotions to users categorized as high value users versus users that are categorized as medium or low value users.

As another example, a service provider providing a retail service may segment users into categories indicating the loyalty level of the user, such as whether a user is a loyal customer, at-risk customer, or lost customer. The service provider may then engage with the users in a personalized manner based on the segmentation. For example, the service provider may provide personalized incentives or promotions to at-risk customers in an effort to retain the customers and/or turn the at-risk customers into loyal customers.

To utilize the functionality of the data segmentation system 108 service providers provide the data segmentation system 108 with data collected using the service provider system 106. The data may be collected from various computing devices and locations. For example, the data may include data gathered by cloud-based servers of service provider system 106 that facilitate a website and/or online service of the service provider. As another example, the data may include data gathered by computing devices included in the service provider system 106 that are implemented at physical locations associated with the service provider, such as point of sale (POS) systems, customer tracking systems, and the like.

The data may include any of a variety of types of data gathered by the service provider. For example, the data may include data describing the service provider's users, individual transactions (purchases, reservations, transfers), and/or any other type of user interactions with the service provider. Other types of interactions include use of the services providers website (e.g., page views, items added to cart, etc.), communications with the service provider's representatives and/or agents (e.g., support representatives, sales agents, etc.), visits to the service provider's physical locations (e.g., store visits), and the like. The data may also include data describing inventory items offered for sale by the service provider. For example, the data may include data identifying the inventory items (e.g., stock keeping unit (SKU) codes), a quantity of the inventory items, the location of the inventory items (e.g., retail store, warehouse, etc.), inventory item type (e.g., pants, shirt, etc.), description of the inventory items (e.g., color, size, etc.), and the like.

The data may be aggregated and/or normalized to describe individual users and/or individual inventory items. For example, data associated with each individual user and/or inventory item may be used to calculate parameter values corresponding to a set of parameters for describing the individual user and/or inventory item. The parameters may include any parameter for describing a user or inventory item. For example, the set of parameters may include parameters that describe a user's interaction history with the service provider, such as an average cart size of the user, a frequency at which the user interacts with the service provider, a purchase history of the user, a recency of the user's latest interaction with the service provider, a user lifetime value (LTV) to the service provider, and the like. The parameters may also include data describing an inventory item, such as an item type, color, size, an average time to sale of the item, an average sale price at which the inventory item was purchased, an average expiration duration of the item, and the like. The parameter values may be calculated by the service provider system 106 prior to transmission of the data to the data segmentation system 108 and/or by the data segmentation system 108.

The data segmentation system 108 uses the data received from the service provider system 106 to provide automated data segmentation for the service provider, as well as any associated functionality (e.g., determining data correlations, personalized engagement, recommendations, etc.). For example, the data is initially used to generate training data for selecting and/or prioritizing individual parameters used for automatic segmentation of the data into a set of predetermined categories. The training data is segmented into the set of predetermined categories by human reviewers and/or according to a predetermined set of criteria or rules. This segmentation may be performed by the service provider prior to transferring the data to the data segmentation system 108 and/or after the data is received by the data segmentation system 108. The data is segmented to place each set of parameter values describing an individual user or inventory item into a category from the set of predetermined categories. For example, data associated with users may be segmented into categories indicating a determined value of the user, loyalty level of the user, and the like. As another example, the data associated with inventory items may be segmented into categories indicating a popularity of the item, shelf life of the item, and the like.

The data segmentation system 108 uses linear regression to analyze the sets of parameter values included in each of the categories to determine a signal strength value for each individual parameter at predicting the categorization of the data (e.g., user or inventory item) into one of the predetermined categories. Parameters determined to be a strong signal of the proper categorization of the data may be assigned a relatively high signal strength value. In contrast, parameters determined to be a weak signal of the proper categorization of the data may be assigned a relatively lower signal strength value.

The data segmentation system 108 ranks the parameters based on the determined signal strength values and may use the ranking to automatically segment data into the categories. For example, the data segmentation system 108 may use the ranking to select a subset of the parameters for use in segmenting data and/or to determine weights to assign to the various parameters when segmenting data.

The data segmentation system 108 uses the ranking along with the parameter values included in the training data to determines threshold segmentation values used for segmenting data (e.g., user or inventory item) into the predetermined categories. For example, the data segmentation system 108 calculates a set of averaged parameter values based on the individual sets of parameter values included in each category. The data segmentation system 108 may then apply weights to the averaged parameters values based on the ranking of the parameters. For example, parameters determined to have a higher signal strength value are given greater weight than parameters having a lower signal strength value.

The data segmentation system 108 uses the resulting weighed averaged parameter values to determine threshold segmentation values for the various categories. The threshold segmentation values define an upper and/or lower limit of a segmentation value range associated with each category. The data segmentation system 108 subsequently uses the threshold segmentation values to automatically segment data into one of the categories. For example, the data segmentation system 108 determines a segmentation value based on a set of parameter values describing a user and/or inventory item then assigns the set data to one of the categories based on the segmentation value range encompassing the segmentation value.

The functionality of the data segmentation system 108 can be used to segment any of a variety of types of data, such as data representing users, items, and the like. Further, the data segmentation system 108 may segment data into any desired type of category, such as categories indicating a customer value level, customer purchasing type, customer loyalty level, item popularity, and the like. The data segmentation system 108 may also derive correlations between the segmented data, such as by identifying correlation and/or affinities between segments of users and inventory items. The segmentation and correlations may be used to provide customized interaction/engagement with users, generate personalized recommendations, generate personalized offers, and the like.

Figure 2:
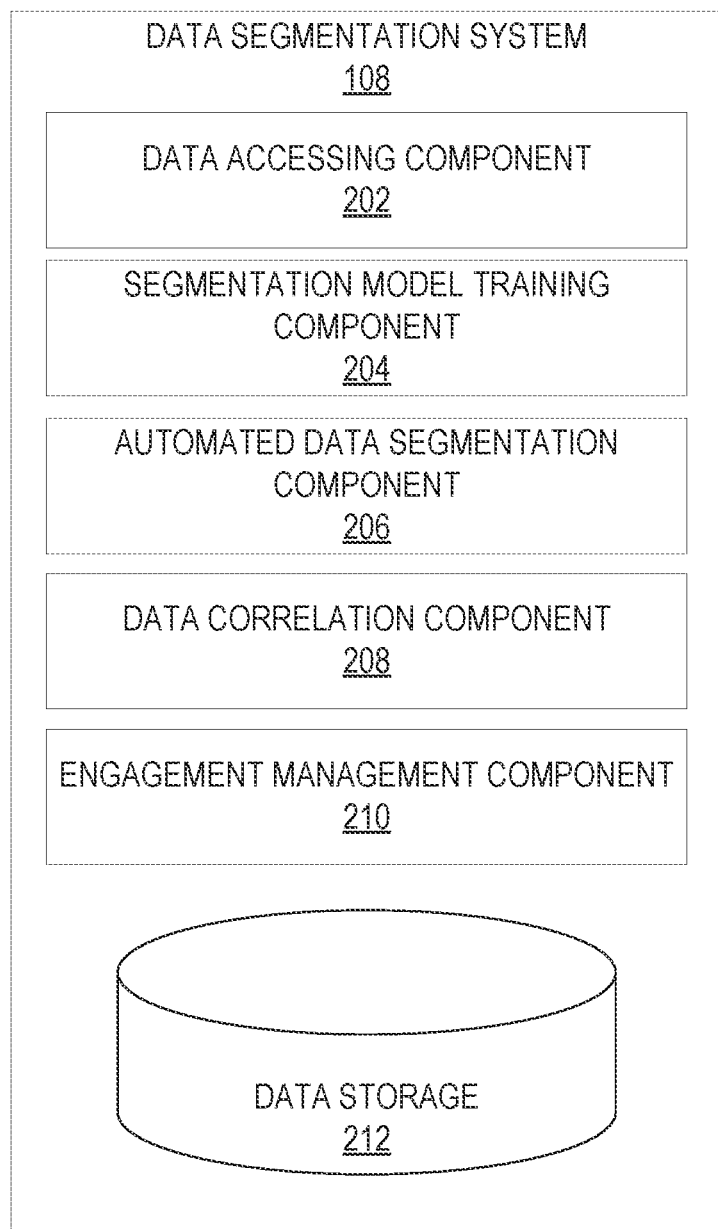
FIG. 2 is a block diagram of a data segmentation system, according to some example embodiments.

FIG. 2 is a block diagram of a data segmentation system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the data segmentation system 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the data segmentation system 108 includes a data accessing component 202, a segmentation model training component 204, an automated data segmentation component 206, a data correlation component 208, an engagement management component 210, and a data storage 212.

The data accessing component 202 accesses data from a service provider for use by the data segmentation system 108. The accessed data may include any of a variety of types of data provided by the service provider to be segmented by the data segmentation system 108. The data accessing component 202 may access the data by receiving transmissions from a service provider system 106. As another example, the data accessing component 202 may periodically query the service provider system 106 for data.

The data accessed from the service provider system 106 may include data collected from various computing devices and locations. For example, the data may include data gathered by cloud-based servers of the service provider system 106 that facilitate a website and/or online service of the service provider. As another example, the data may include data gathered by computing devices included in the service provider system 106 that are implemented at physical locations associated with the service provider, such as point of sale (POS) systems, customer tracking systems, and the like.

The data may include any of a variety of types of data gathered by the service provider. For example, the data may include data describing the service provider's users, individual transactions (purchases, reservations, transfers), and/or any other type of user interactions with the service provider. Other types of interactions include use of the services providers website (e.g., page views, items added to cart, etc.), communications with the service provider's representatives and/or agents (e.g., support representatives, sales agents, etc.), visits to the service provider's physical locations (e.g., store visits), and the like. The data may also include data describing inventory items offered for sale by the service provider. For example, the data may include data identifying the inventory items (e.g., stock keeping unit (SKU) codes), a quantity of the inventory items, the location of the inventory items (e.g., retail store, warehouse, etc.), inventory item type (e.g., pants, shirt, etc.), description of the inventory items (e.g., color, size, etc.), and the like.

The data may be aggregated and/or normalized to describe individual users and/or individual inventory items. For example, data associated with each individual user and/or inventory item may be used to calculate a set of parameter values corresponding to a set of parameters for describing the individual user and/or inventory item. The parameters may include any parameter for describing a user or inventory item. For example, the set of parameters may include parameters that describe a user's interaction history with the service provider, such as an average cart size of the user, a frequency at which the user interacts with the service provider, a purchase history of the user, a recency of the user's latest interaction with the service provider, a user lifetime value (LTV), and the like. The parameters may also include data describing an inventory item, such as an item type, color, size, an average time to sale of the item, an average sale price at which the inventory item was purchased, an average expiration duration of the item, and the like. The parameter values may be calculated by the service provider system 106 prior to transmission of the data to the data segmentation system 108 and/or by the data segmentation system 108.

The data accessing component 202 may store the data accessed from the service provider system 106 in the data storage 212, where it may be accessed by the other components of the data segmentation system 108. The data accessing component 202 may associate the stored data with an identifier for the service provider from which the data was accessed.

The segmentation model training component 204 generates segmentation models (e.g., machine learning models) for automatically segmenting data into predetermined categories for a service provider. For example, the segmentation models generated by the segmentation model training component 204 receive input data describing a user or inventory item and provide an output segmenting the user or inventory item into a specific category.

The segmentation model training component 204 initially trains the segmentation models using training data describing users or inventory items that have been categorized into a set of predetermined categories. The training data may include a set of parameter values corresponding to a set of parameters for describing a user or inventory item. For example, the set of parameters may include individual parameters describing different aspects or features of a user or inventory item, such as demographic data describing a user (e.g., age, geographic location, sex), an interaction history of the user (e.g., purchase amount, purchasing frequency, cart size, interaction recency), data describing an item (e.g., item type, color, size, shelf life), interaction history of the item (e.g., average time to sale), and the like. The training data may be categorized into any desired set of predetermined categories by human reviewers and/or based on a set of predetermined criteria.

In some embodiments, the segmentation model training component 204 uses linear regression to analyze the set of parameter values included in each of the categories to determine signal strength values for the individual parameters. The signal strength value determined for a parameter indicates the strength of the parameter at predicting the categorization of the data (e.g., user or inventory item) into one of the predetermined categories. For example, parameters determined to be a strong signal of the proper categorization of the data may be assigned a relatively high signal strength value, whereas parameters determined to be a weak signal of the proper categorization of the data may be assigned a relatively lower signal strength value.

The segmentation model training component 204 may use the resulting signal strength values to rank the individual parameters. For example, the parameter values may be ranked from the parameter with the highest signal strength value to the parameter with the lowest signal strength value. In some embodiments, the segmentation model training component 204 may select a subset of the parameters based on the ranking for use by a segmentation model to segment data into the categories. For example, the segmentation model training component 204 may select a predetermined number of the highest ranked parameters, such as the top 4 or 5 highest ranked parameters. As another example, the segmentation model training component 204 may select a subset of the parameters that have a signal strength value that meets or exceeds a threshold signal strength value.

In this way, the segmentation model training component 204 provides for automated selection of the parameters that are best suited for predicting the categorization of data into the predetermined categories. This provides a technical improvement by limiting the number of parameters that are used by the resulting segmentation model to categorize data. For example, selecting a subset of the possible parameters for use by the segmentation model reduces the number of computations performed by the segmentation model to categorize the data, thereby increasing the perceived speed at which the segmentation model performs the segmentation of the data.

The segmentation model training component 204 also determines weight values for the parameters based on the ranking. The weight values provide greater weight to parameters that are stronger signals for predicting the categorization of data (e.g., user, inventory item) into the predetermined categories. For example, the segmentation model training component 204 assigns higher weight values to parameters with relatively higher signal strength values than to parameters with relatively lower signal strength values.

The segmentation model training component 204 uses the weight values and the selected parameters to determine threshold segmentation scores for categorizing data into the predetermined categories. The threshold segmentation values define an upper and/or lower limit of a segmentation value range associated with each category. To calculate the threshold segmentation value, the segmentation model training component 204 calculates a set of averaged parameter values based on the individual sets of parameter values included in each category. The segmentation model training component 204 may then apply the determined weights to the averaged parameters value, resulting in a set of weighted averaged parameter values. The segmentation model training component 204 uses the weighed averaged parameter values to then determine threshold segmentation values for the various categories.

Linear regression and threshold segmentation values is just one example, of how the segmentation model training component 204 may generate a segmentation model for segmenting data into the predetermined categories. In other embodiments, the segmentation model training component 204 may generate a classification model for segmenting data. In this type of embodiment, the segmentation model training component 204 may generate training vectors based on the training data. Each training vector may represent a single user or inventory item described in the training data as well as the category into which the user or inventory item has been segmented. The training vectors may be generated based on each pf the parameters included in the training data or a selected subset of the parameters, as described above. The segmentation model training component 204 may generate the training vectors using any of a variety of known algorithms or machine learning models for the generating vector representations of data.

The segmentation model training component 204 may use the resulting training vectors to train a classification model that outputs a set of probability values corresponding to a set of labels. Each label corresponds to one of the predetermined categories and each probability value indicates the likelihood that one of the labels properly classifies the input data.

The segmentation model training component 204 may generate multiple segmentation models for a service provider. For example, the segmentation model training component 204 may generate segmentation models for segmenting different types of data, such as users and inventory items.

The segmentation model training component 204 may generate segmentation models for segmenting data into different types of categories, such as categories describing the value of a customer, the type of customer, the popularity of an item, and the like.

The segmentation model training component 204 may also generate individual segmentation models for different channels or locations associated with a service provider. For example, the segmentation model training component 204 may generate separate segmentation models for each retail location of a service provider or for groups of retail locations, such as a regional grouping of retail locations. As another example, the segmentation model training component 204 may generate different segmentation models based on different channels, such as a segmentation model for online services provided by the service provider and separate segmentation modes for physical retail locations. As another example, the segmentation model training component 204 may generate different segmentation models for different websites or portions of a singular website provided a service provider.

The segmentation model training component 204 stores the generated segmentation models in the data storage 212, where they may be accessed by the other components of the data segmentation system 108. The segmentation model training component 204 may also further refine the generated segmentation models based on subsequent training data and feedback. For example, manual reviewers may provide feedback indicating whether the output of a segmentation model properly segmented data. The segmentation model training component 204 may use the feedback data along with any additional training data to further refine the segmentation models, such as by adjusting the signal strength values for the various parameters, selecting different parameters for use by the segmentation model, adjusting the weight values, adjusting the threshold segmentation values, retraining a classification model, and the like.

The automated data segmentation component 206 provides automatic data segmentation for a service provider. This may include segmenting data (e.g., users, inventory items) into categories based on a set of rules provided by a service provider as well as predictive segmentation using the segmentation models generated by the segmentation model training component 204.

A service provider may configure a set of rules for segmenting users and/or inventory items into segments based on data received from the service provider computing system 106. For example, the rules may be based on interaction data, sales data, inventory data, and the like.

In some embodiments, the automated data segmentation component 206 may segment users based on user engagement, such as based on user purchase history, interactions with the service provider's website and/or physical retail locations, and the like. For example, the automated data segmentation component 206 may segment users into either a one-time interaction category indicating that the user has performed a single interaction (e.g., purchase, store visit) within a given time frame, or a repeat interaction category, indicating that the user has performed multiple interactions with the service provider within a given time frame.

The automated data segmentation component 206 may further segment the users into subcategories based on an elapsed period of time after a most recent interaction of the user. For example, users in the one-time interaction category may be further segmented into categories indicating whether the user is a potential repeat customer, at-risk customer, or lost customer. Similarly, users segmented in the repeat interaction category may be further segmented into subcategories indicating whether the user is a loyal customer, breakaway customer, at-risk customer, or lost customer.

As another example, the automated data segmentation component 206 may segment users based on a behavior classification of the user, such as whether the user is a full price shopper, a value shopper, a trend setter, and/or a trend follower that purchases items. In this type of embodiment, the rules defined by a service provider may indicate criteria for segmenting the users into the categories. For example, the rules may dictate a threshold percentage of purchases made at full price and/or a discounted price for segmenting users as either a full price shopper or a value shopper. Similarly, the rules may dictate a threshold period of time for purchasing an inventory after its initial release for segmenting users as either a trend setter or trend follower.

These are just some examples of segmenting users and are not meant to be limiting. The automated data segmentation component 206 may segment users based on a variety of other criteria, such as age, location, gender, user LTV, and the like. Similarly, the automated data segmentation component 206 may segment inventory items based on a variety of factors, such as item type, color, location, and the like. The automated data segmentation component 206 may also segment inventory items based on how recently the inventory items were received/released (e.g., new arrival), a popularity of the item (e.g., best seller), how quickly the item sells (e.g., hot item, slow mover), and the like.

As will be explained in greater detail below, segmentation of the users and/or inventory items may be used for personalized engagement with users, identifying affinities/correlations between segments of users and/or inventory items, generating personalized recommendations, and/or presenting analytics. The automated data segmentation component 206 may store data identifying the segmentation of the users and/or inventory items in the data storage 212, where the data may be accessible by the other components of the data segmentation system 108.

The automated data segmentation component 206 may also segment users and inventory items using the segmentation models generated by the segmentation model training component 204. For example, the automated data segmentation component 206 may access the trained segmentation models from the data storage 212 for use in segmenting users or inventory items. To use the generated segmentation models, the automated data segmentation component 206 generates an input to be used with the segmentation model based on a set of data associated with a user or inventory item. For example, the automated data segmentation component 206 may generate an input using a similar technique used by the segmentation model training component 204 to generate the segmentation model. That is, the automated data segmentation component 206 may use the same set of parameters and parameter rankings used to generate the segmentation model or the same parameters and vector generation algorithm used to generate the segmentation model (e.g., classification model).

In embodiments in which the segmentation model is generated using threshold segmentation values, the automated data segmentation component 206 may generate a set of parameter values from data describing a user or inventory item and apply weights to the parameter values based on the parameter ranking determined for the particular segmentation model. The automated data segmentation component 206 may then calculate a segmentation value for the user or inventory item based on the set of parameter values, which is compared to the threshold segmentation values to determine the proper segmentation of the user or inventory item.

In embodiments in which the segmentation model is a classification model, the automated data segmentation component 206 generates an input vector based on the set of parameters and parameter ranking determined for the particular segmentation model. The automated data segmentation component 206 may use the resulting input vector as input to the classification model, which provides a set of probability values for the various labels. The automated data segmentation component 206 identifies the classification label with the highest probability score and segments the user or inventory item into the category corresponding to the identified classification label.

The data correlation component 208 identifies correlations between data based on the segmentation performed by the automated data segmentation component 206. For example, the data correlation component 208 may determine correlations between users and inventory items, such as by identifying affinities between users and inventory items. That is, the data correlation component 208 may identify inventory items or categories of inventory items that particular users have an affinity towards.

To accomplish this, the data correlation component 208 may analyze data associated with inventory items in a particular category to identify users that have interacted with the items in the category. For example, the data correlation component 208 may identify users that purchased the items included in the category. The data correlation component 208 may then analyze data associated with the identified users to determine common segmentations of the users, indicating a correlation between the user segmentation and the inventory segmentation.

As another example, the data correlation component 208 may analyze data associated with inventory items purchased by a segmentation of user to determine the types of inventory items that users in the segmentation of users may like. For example, the data correlation component 208 may identify inventory items that are commonly purchased my users included in the segment. The data correlation component 208 may then use parameters describing the inventory items, such as color, item, type, and the like, to identify other users that may be of interest to the users in the segment. The data correlation component 208 may store data defining the determined affinities between users and/or inventory items in the data storage 212.

The engagement management component 210 manages personalized engagement with users based on the segmentation of the users and/or items. Personalized engagement includes providing a user with a recommendation and/or promotion that is selected, generated, and/or delivered based on the specific user. For example, a user that is a trend setter may be provided with a recommendation to purchase a newly released item. As another example, a user that is determined to be an at-risk customer may be provided with a promotional offer to in an effort to retain the user and/or turn the user from an at-risk customer into a loyal customer. As another example, a user that is a trend setter may be provided with a promotion to receive early access to a newly released item, whereas a user that is cost conscious may be provided with a promotion offering a discount to purchase the item.

The engagement management component 210 performs personalized engagement based on configuration parameters provided by a service provider. The configuration parameters may define configurations, triggers, and/or constraints for generating personalized engagement. For example, the configuration parameters may include triggers for engaging users. A trigger is one or more conditions that, if met, causes performance of a specified engagement. For example, the engagement may be transmitting a message and/or promotion to a user, sending a recommendation to a user, and the like.

The triggers may include any type of conditions. For example, a triggering condition may be detecting a change in the segmentation of a user, such as detecting a change in the segmentation of a user a loyal customer to an at-risk customer. As another example, a triggering condition may be based on detecting a change in segmentation of an item, such as an item changing segmentation from a hot item to a slow mover. As another example, a triggering condition may be based on a remaining time until an expiration date of an item, such as an item being within one week of expiring. These are just some examples of triggering conditions and are not meant to be limiting. The configuration parameters may utilize any of a variety of type and combinations of triggering conditions.

The configuration parameters may also include configurations and constraints for engagements that are sent to users. For example, the configurations may identify rules for selecting users to received promotions when a triggering condition has been satisfied. In some embodiments, the rules may identify a specific segmentation or segmentations of users to receive an engagement. For example, a rule may identify that users segmented as value shoppers to receive a promotion for an item that is nearing its expiration date. As another example, a rule may identify that users determined to have an affinity for item se receive a promotion for the item when a specified triggering condition is satisfied.

The constraints included in the configuration parameters may identify constraints on the types or extent of promotions that may be provided to a user. For example, the promotions may include a maximum discounted amount or percentage that may be offered to a user as a promotion. As another example, the constraints may identify a constraint on a number of users that may receive the promotions. These are just some examples of configurations and constraints that may be included in the configuration parameters and are not meant to be limiting. The configuration parameters may include any of a variety of types of configurations and promotions.

Figure 3:
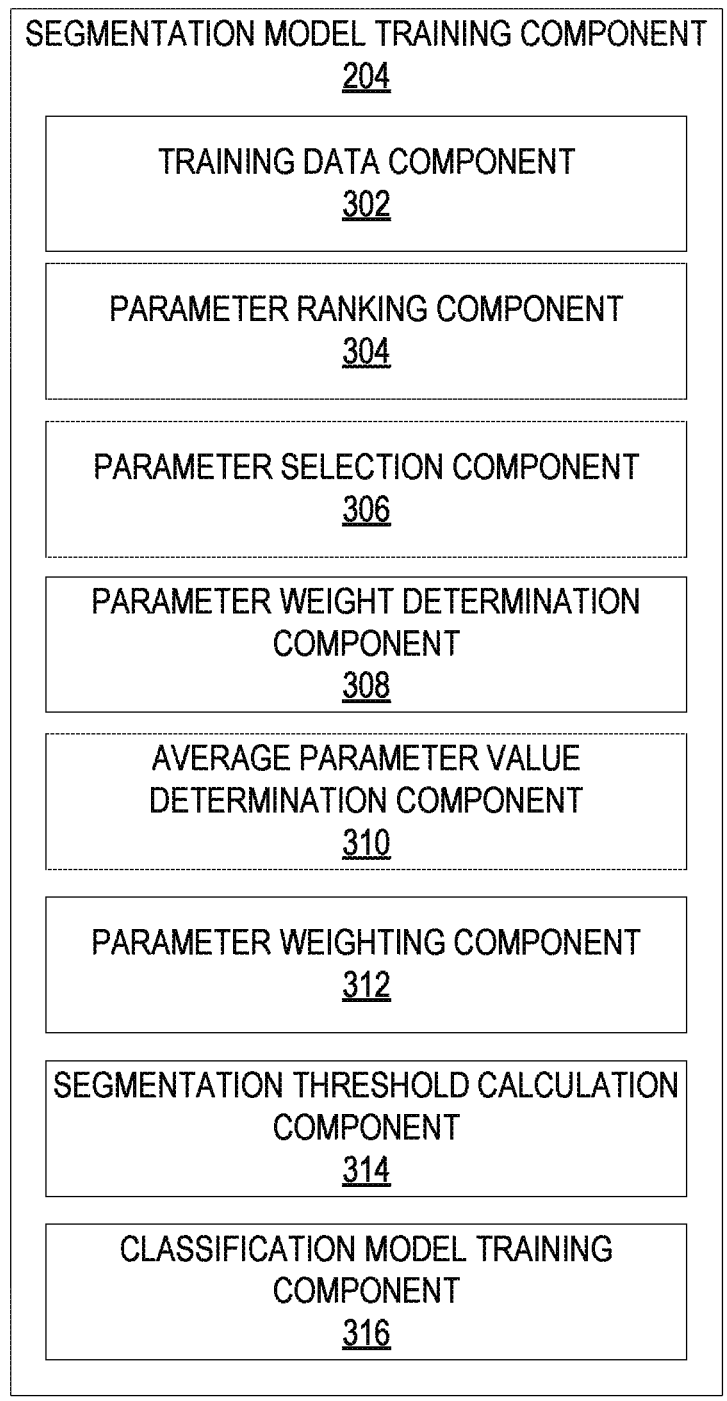
FIG. 3 is a block diagram of a segmentation model training component, according to some example embodiments.

FIG. 3 is a block diagram of a segmentation model training component 204, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the segmentation model training component 204 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the segmentation model training component 204 includes a training data component 302, a parameter ranking component 304, a parameter selection component 306, a parameter weight determination component 308, an average parameter value determination component 310, a parameter weighting component 312, a segmentation threshold calculation component 314, and a classification model training component 316.

The training data component 302 accesses and/or generates training data for training a data segmentation model. A data segmentation model is a model that segments data describing a user or inventory item into a category from a predetermined set of categories. The training data may include a set of parameter values corresponding to a set of parameters for describing a user or inventory item. For example, the set of parameters may include individual parameters describing different aspects or features of a user or inventory item, such as demographic data describing a user (e.g., age, geographic location, sex), an interaction history of the user (e.g., purchase amount, purchasing frequency, cart size, interaction recency), data describing an item (e.g., item type, color, size, shelf life), interaction history of the item (e.g., average time to sale), and the like. The training data may be categorized into any desired set of predetermined categories by human reviewers and/or based on a set of predetermined criteria.

The parameter ranking component 304 determines a prioritization and/or ranking of various parameters that describe a user and/or inventory item. The parameter ranking component 304 determines the prioritization by uses linear regression to analyze the set of parameter values included in each of the categories of training data. The linear regression provides signal strength values for the individual parameters. The signal strength value determined for each parameter indicates the strength of the parameter at predicting the categorization of the data (e.g., user or inventory item) into one of the predetermined categories. For example, parameters determined to be a strong signal of the proper categorization of the data may be assigned a relatively high signal strength value, whereas parameters determined to be a weak signal of the proper categorization of the data may be assigned a relatively lower signal strength value. The parameter ranking component 304 may use the resulting signal strength values to rank the individual parameters. For example, the parameter values may be ranked from the parameter with the highest signal strength value to the parameter with the lowest signal strength value.

The parameter selection component 306 selects a subset of the parameter values based on the ranking. In some embodiments, a subset of the parameters may be selected based on the ranking for use by a segmentation model to segment data into the categories. For example, the parameter selection component 306 may select a predetermined number of the highest ranked parameters, such as the top 4 or 5 highest ranked parameters. As another example, the parameter selection component 306 may select a subset of the parameters that have a signal strength value that meets or exceeds a threshold signal strength value.

In this way, the parameter selection component 306 provides for automated selection of the parameters that are best suited for predicting the categorization of data into the predetermined categories. This provides a technical improvement by limiting the number of parameters that are used by the resulting segmentation model to categorize data. For example, selecting a subset of the possible parameters for use by the segmentation model reduces the number of computations performed by the segmentation model to categorize the data, thereby increasing the perceived speed at which the segmentation model performs the segmentation of the data.

Use of the parameter selection component 306 to select a subset of the parameters is optional. For example, in some embodiments, each of the parameters is used by the resulting segmentation model, rather than a subset of the parameters.

The parameter weight determination component 308 determines weight values for the parameters based on the ranking. The weight values provide greater weight to parameters that are stronger signals for predicting the categorization of data (e.g., user, inventory item) into the predetermined categories. For example, the parameter weight determination component 308 assigns higher weight values to parameters with relatively higher signal strength values than to parameters with relatively lower signal strength values.

The average parameter value determination component 310 calculates a set of averaged parameter values based on the individual sets of parameter values included in each category. For example, the average parameter value determination component 310 may access the individual parameter values corresponding to a single parameter from each set of parameter values in the category and determine an average parameter value based on the set of individual parameter values. The average parameter value determination component 310 may repeat this process for each of the parameters to determine the set of averaged parameter values for each category.

The parameter weighting component 312 applies weights to the sets of averaged parameter values for each category. For example, the parameter weighting component 312 applies the weights determined by the parameter weight determination component 308 to the averaged parameter values in each set of averaged parameters values, resulting in sets of weighted averaged parameter values for each category.

The segmentation threshold calculation component 314 calculates segmentation threshold values for each category based on the sets of weighted averaged parameter values. The threshold segmentation values define an upper and/or lower limit of a segmentation value range associated with each category. For example, the segmentation threshold calculation component 314 may calculate the segmentation threshold values by determining an overall segmentation value based on each set of weighted averaged parameter values. This may include determining an average of the individual values in the set of weighted averaged parameter values, a sum of the individual values in the set of weighted averaged parameter values, and the like.

The resulting overall segmentation values may be the threshold segmentation values or used to calculate the threshold segmentation values. For example, the segmentation threshold calculation component 314 may use the overall segmentation values for each category to determine threshold segmentation values that encompass the overall segmentation values. In some embodiments, the segmentation threshold calculation component 314 may determine the threshold segmentation values by determining a value between two overall segmentation values, such as by selecting a value that is equal distance or near equal distance between the two overall segmentation values.

The classification model training component 316 trains a classification model for automatically segmenting data into categories. Linear regression and threshold segmentation values is just one example, of how the segmentation model training component 204 may generate a segmentation model for segmenting data into predetermined categories. In other embodiments, the classification model training component 316 may generate a classification model for segmenting data. In this type of embodiment, the classification model training component 316 generates training vectors based on the training data. Each training vector may represent a single user or inventory item described in the training data as well as the category into which the user or inventory item has been segmented. The training vectors may be generated based on each pf the parameters included in the training data or a selected subset of the parameters, as described above. The classification model training component 316 may generate the training vectors using any of a variety of known algorithms or machine learning models for the generating vector representations of data.

The classification model training component 316 may use the resulting training vectors to train a classification model that outputs a set of probability values corresponding to a set of labels. Each label corresponds to one of the predetermined categories and each probability value indicates the likelihood that one of the labels properly classifies the input data.

Figure 4:
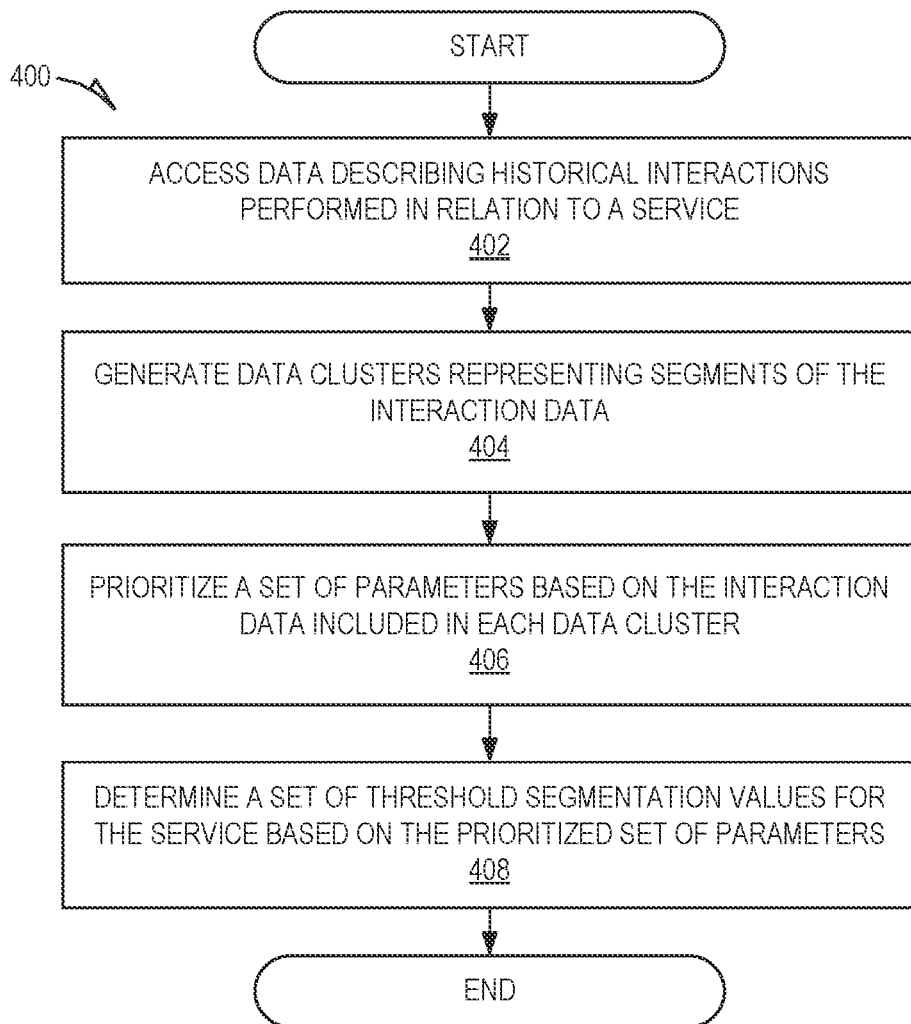
FIG. 4 is a flowchart showing a method for data segmentation using machine learning, according to some example embodiments.

FIG. 4 is a flowchart showing a method 400 for data segmentation using machine learning, according to some example embodiments. The method 400 may be embodied in computer readable instructions for execution by one or more processors such that the operations of the method 400 may be performed in part or in whole by the data segmentation system 108; accordingly, the method 400 is described below by way of example with reference thereto. However, it shall be appreciated that at least some of the operations of the method 400 may be deployed on various other hardware configurations and the method 400 is not intended to be limited to the data segmentation system 108.

At operation 402, the data accessing component 202 accesses data describing historical interactions performed in relation to a service. The data accessing component 202 accesses data from a service provider that provides the service. The service may include the service provider overall or a subset of the services provided by a service provider, such as a particular physical location (e.g., retail store) or channel associated with the service provider (e.g., online).

The accessed data may include any of a variety of types of data provided by the service provider to be segmented by the data segmentation system 108. The data accessing component 202 may access the data by receiving transmissions from a service provider system 106. As another example, the data accessing component 202 may periodically query the service provider system 106 for data.

The data accessed from the service provider system 106 may include data collected from various computing devices and locations. For example, the data may include data gathered by cloud-based servers of the service provider system 106 that facilitate a website and/or online service of the service provider. As another example, the data may include data gathered by computing devices included in the service provider system 106 that are implemented at physical locations associated with the service provider, such as point of sale (POS) systems, customer tracking systems, and the like.

The data may include any of a variety of types of data gathered by the service provider. For example, the data may include data describing the service provider's users, individual transactions (purchases, reservations, transfers), and/or any other type of user interactions with the service provider. Other types of interactions include use of the services providers website (e.g., page views, items added to cart, etc.), communications with the service provider's representatives and/or agents (e.g., support representatives, sales agents, etc.), visits to the service provider's physical locations (e.g., store visits), and the like. The data may also include data describing inventory items offered for sale by the service provider. For example, the data may include data identifying the inventory items (e.g., stock keeping unit (SKU) codes), a quantity of the inventory items, the location of the inventory items (e.g., retail store, warehouse, etc.), inventory item type (e.g., pants, shirt, etc.), description of the inventory items (e.g., color, size, etc.), and the like.

The data may be aggregated and/or normalized to describe individual users and/or individual inventory items. For example, data associated with each individual user and/or inventory item may be used to calculate a set of parameter values corresponding to a set of parameters for describing the individual user and/or inventory item. The parameters may include any parameter for describing a user or inventory item. For example, the set of parameters may include parameters that describe a user's interaction history with the service provider, such as an average cart size of the user, a frequency at which the user interacts with the service provider, a purchase history of the user, a recency of the user's latest interaction with the service provider, a user lifetime value (LTV), and the like. The parameters may also include data describing an inventory item, such as an item type, color, size, an average time to sale of the item, an average sale price at which the inventory item was purchased, an average expiration duration of the item, and the like. The parameter values may be calculated by the service provider system 106 prior to transmission of the data to the data segmentation system 108 and/or by the data segmentation system 108.

At operation 404, the training data component 302 generates data clusters representing segments of the interaction data. The data clusters are used to train a segmentation model. The data clusters may be generated based on categorizations determined by human reviewers and/or according to a predetermined set of criteria or rules. The data clusters may each represent a predetermined category for segmenting the data.

At operation 406, the parameter ranking component 304 prioritizes a set of parameters based on the interaction data included in each data cluster. The parameter ranking component 304 determines a prioritization and/or ranking of various parameters included in the data, such as parameters that describe a user and/or inventory item.

The parameter ranking component 304 determines the prioritization by uses linear regression to analyze the set of parameter values included in each of the data clusters. The linear regression provides signal strength values for the individual parameters. The signal strength value determined for each parameter indicates the strength of the parameter at predicting the categorization of the data (e.g., user or inventory item) into one of the predetermined categories. For example, parameters determined to be a strong signal of the proper categorization of the data may be assigned a relatively high signal strength value, whereas parameters determined to be a weak signal of the proper categorization of the data may be assigned a relatively lower signal strength value.

The parameter ranking component 304 may use the resulting signal strength values to rank the individual parameters. For example, the parameter values may be ranked from the parameter with the highest signal strength value to the parameter with the lowest signal strength value.

At operation 408, the segmentation threshold calculation component 314 determines a set of threshold segmentation values for the service based on the prioritized set of parameters. The threshold segmentation values define an upper and/or lower limit of a segmentation value range associated with each category. To calculate the threshold segmentation value, the segmentation threshold calculation component 314 calculates a set of averaged parameter values based on the individual sets of parameter values included in each data cluster. The segmentation threshold calculation component 314 may then apply weights determined based on the ranking of the parameters to the averaged parameters value, resulting in a set of weighted averaged parameter values. The segmentation threshold calculation component 314 uses the weighed averaged parameter values to then determine threshold segmentation values for the various categories.

Figure 5:
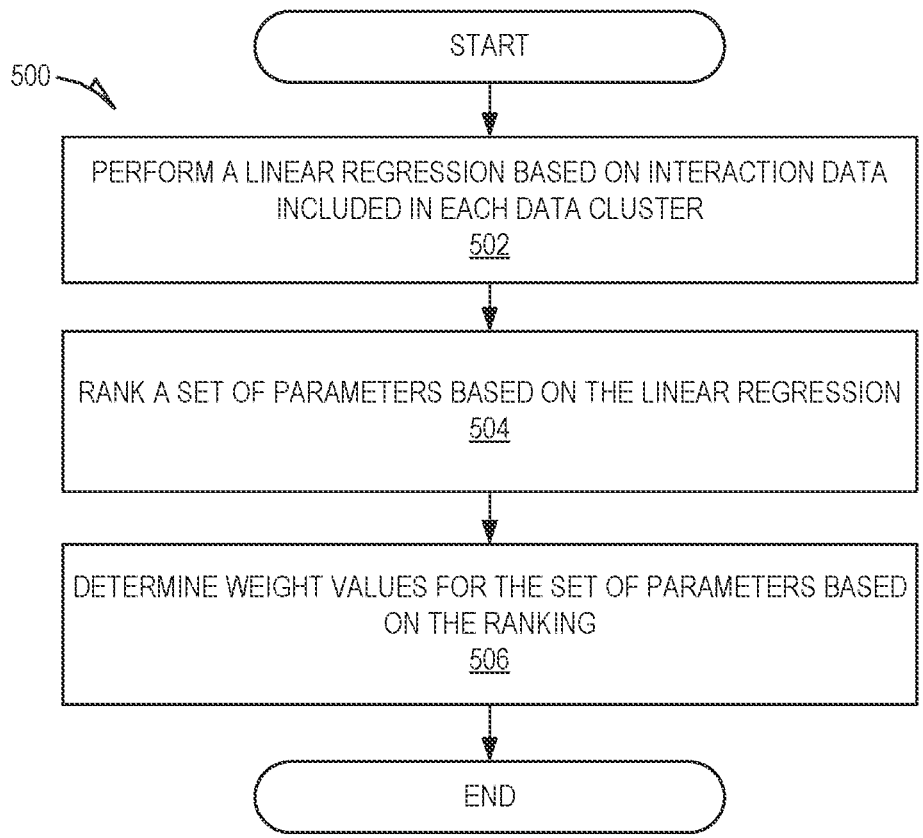
FIG. 5 is a flowchart showing a method for prioritizing a set of parameter values, according to some example embodiments.

FIG. 5 is a flowchart showing a method 500 for prioritizing a set of parameter values, according to some example embodiments. The method 500 may be embodied in computer readable instructions for execution by one or more processors such that the operations of the method 500 may be performed in part or in whole by the data segmentation system 108; accordingly, the method 500 is described below by way of example with reference thereto. However, it shall be appreciated that at least some of the operations of the method 500 may be deployed on various other hardware configurations and the method 500 is not intended to be limited to the data segmentation system 108.

At operation 502, the parameter ranking component 304 performs a linear regression based on interaction data included in each data cluster. The linear regression provides signal strength values for the individual parameters. The signal strength value determined for each parameter indicates the strength of the parameter at predicting the categorization of the data (e.g., user or inventory item) into one of the predetermined categories. For example, parameters determined to be a strong signal of the proper categorization of the data may be assigned a relatively high signal strength value, whereas parameters determined to be a weak signal of the proper categorization of the data may be assigned a relatively lower signal strength value.

At operation 504, the parameter ranking component 304 ranks a set of parameters based on the linear regression. For example, the parameter ranking component 304 ranks the parameter values from the parameter with the highest signal strength value to the parameter with the lowest signal strength value.

At operation 506, the parameter weight determination component 308 determines weight values for the set of parameters based on the ranking. The weight values provide greater weight to parameters that are stronger signals for predicting the categorization of data (e.g., user, inventory item) into the predetermined categories. For example, the parameter weight determination component 308 assigns higher weight values to parameters with relatively higher signal strength values than to parameters with relatively lower signal strength values.

Figure 6:
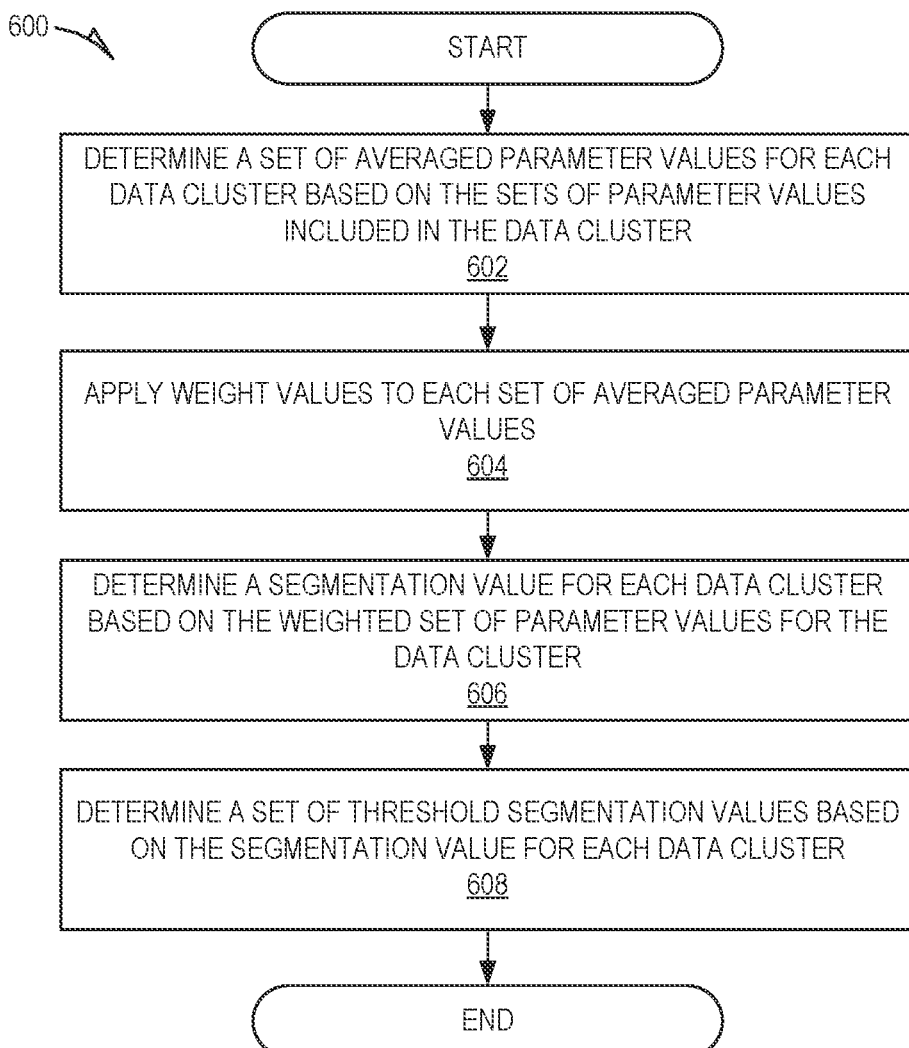
FIG. 6 is a flowchart showing a method for determining a set of threshold segmentation values, according to some example embodiments.

FIG. 6 is a flowchart showing a method 600 for determining a set of threshold segmentation values, according to some example embodiments. The method 600 may be embodied in computer readable instructions for execution by one or more processors such that the operations of the method 600 may be performed in part or in whole by the data segmentation system 108; accordingly, the method 600 is described below by way of example with reference thereto. However, it shall be appreciated that at least some of the operations of the method 600 may be deployed on various other hardware configurations and the method 600 is not intended to be limited to the data segmentation system 108.

At operation 602, the average parameter value determination component 310 determines a set of average parameter values for each data cluster based on the sets of parameter values included in the data cluster. For example, the average parameter value determination component 310 may access the individual parameter values corresponding to a single parameter from each set of parameter values in the data cluster and determine an average parameter value based on the set of individual parameter values. The average parameter value determination component 310 may repeat this process for each of the parameters to determine the set of averaged parameter values for each data cluster (e.g., category).

At operation 604, the parameter weighting component 312 applies weight values to each set of averaged parameter values. For example, the parameter weighting component 312 applies the weights determined by the parameter weight determination component 308 to the averaged parameter values in each set of averaged parameters values, resulting in sets of weighted averaged parameter values for each category.

At operation 606, the segmentation threshold calculation component 314 determines a segmentation value for each data cluster based on the weighted set of parameter values for the data cluster. For example, the segmentation threshold calculation component 314 determines an average of the individual values in the set of weighted averaged parameter values, a sum of the individual values in the set of weighted averaged parameter values, and the like.

At operation 608, the segmentation threshold calculation component 314 determines a set of threshold segmentation values based on the segmentation value for each data cluster. The threshold segmentation values define an upper and/or lower limit of a segmentation value range associated with each category corresponding to a data cluster. In some embodiments, the segmentation value determines for a data cluster may itself be the threshold segmentation values.

Alternatively, the segmentation threshold calculation component 314 may use the segmentation values to calculate the threshold segmentation values. For example, the segmentation threshold calculation component 314 may use the segmentation values for each data cluster to determine threshold segmentation values that encompass the segmentation values. In some embodiments, the segmentation threshold calculation component 314 may determine the threshold segmentation values by determining a value that falls between two separate segmentation values, such as by selecting a value that is equal distance or near equal distance between the two segmentation values.

Figure 7:
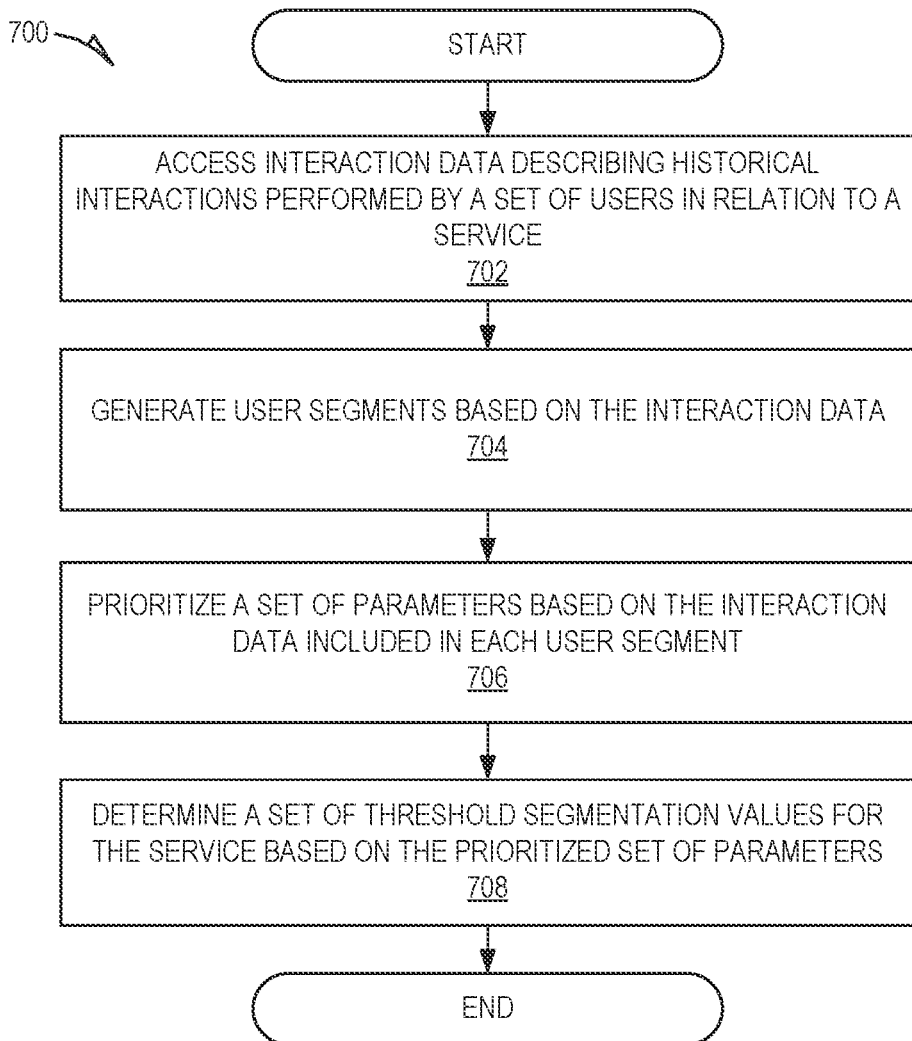
FIG. 7 is a flowchart showing a method for data segmentation of users using machine learning, according to some example embodiments.

FIG. 7 is a flowchart showing a method 700 for data segmentation of users using machine learning, according to some example embodiments. The method 700 may be embodied in computer readable instructions for execution by one or more processors such that the operations of the method 700 may be performed in part or in whole by the data segmentation system 108; accordingly, the method 700 is described below by way of example with reference thereto. However, it shall be appreciated that at least some of the operations of the method 700 may be deployed on various other hardware configurations and the method 700 is not intended to be limited to the data segmentation system 108.

At operation 702, the data accessing component 202 accesses interaction data describing historical interactions performed by a set of users in relation to a service. The data accessing component 202 accesses data from a service provider that provides the service. The service may include the service provider overall or a subset of the services provided by a service provider, such as a particular physical location (e.g., retail store) or channel associated with the service provider (e.g., online).

The accessed data may include any of a variety of types of data provided by the service provider to be segmented by the data segmentation system 108. The data accessing component 202 may access the data by receiving transmissions from a service provider system 106. As another example, the data accessing component 202 may periodically query the service provider system 106 for data.

The data accessed from the service provider system 106 may include data collected from various computing devices and locations. For example, the data may include data gathered by cloud-based servers of the service provider system 106 that facilitate a website and/or online service of the service provider. As another example, the data may include data gathered by computing devices included in the service provider system 106 that are implemented at physical locations associated with the service provider, such as point of sale (POS) systems, customer tracking systems, and the like.

The data may include any of a variety of types of data gathered by the service provider. For example, the data may include data describing the service provider's users, individual transactions (purchases, reservations, transfers), and/or any other type of user interactions with the service provider. Other types of interactions include use of the services providers website (e.g., page views, items added to cart, etc.), communications with the service provider's representatives and/or agents (e.g., support representatives, sales agents, etc.), visits to the service provider's physical locations (e.g., store visits), and the like. The data may also include data describing inventory items offered for sale by the service provider. For example, the data may include data identifying the inventory items (e.g., stock keeping unit (SKU) codes), a quantity of the inventory items, the location of the inventory items (e.g., retail store, warehouse, etc.), inventory item type (e.g., pants, shirt, etc.), description of the inventory items (e.g., color, size, etc.), and the like.

The data may be aggregated and/or normalized to describe individual users and/or individual inventory items. For example, data associated with each individual user and/or inventory item may be used to calculate a set of parameter values corresponding to a set of parameters for describing the individual user and/or inventory item. The parameters may include any parameter for describing a user or inventory item. For example, the set of parameters may include parameters that describe a user's interaction history with the service provider, such as an average cart size of the user, a frequency at which the user interacts with the service provider, a purchase history of the user, a recency of the user's latest interaction with the service provider, a user lifetime value (LTV), and the like. The parameters may also include data describing an inventory item, such as an item type, color, size, an average time to sale of the item, an average sale price at which the inventory item was purchased, an average expiration duration of the item, and the like. The parameter values may be calculated by the service provider system 106 prior to transmission of the data to the data segmentation system 108 and/or by the data segmentation system 108.

At operation 704, the training data component 302 generates user segments based on the interaction data. The user segments include a subset of the user and are used to train a segmentation model. The user segments may be generated based on categorizations determined by human reviewers and/or according to a predetermined set of criteria or rules. The user segments may each represent a predetermined category for segmenting the users.

At operation 706, the parameter ranking component 304 prioritizes a set of parameter values based on the interaction data included in each user segment. The parameter ranking component 304 determines a prioritization and/or ranking of various parameters included in the data, such as parameters that describe a user and/or inventory item.

At operation 708, the segmentation threshold calculation component 314 determines a set of threshold segmentation values for the service based on the prioritized set of parameter values. The threshold segmentation values define an upper and/or lower limit of a segmentation value range associated with each user segment. To calculate the threshold segmentation value, the segmentation threshold calculation component 314 calculates a set of averaged parameter values based on the individual sets of parameter values included in each user segment. The segmentation threshold calculation component 314 may then apply weights determined based on the ranking of the parameters to the averaged parameters value, resulting in a set of weighted averaged parameter values. The segmentation threshold calculation component 314 uses the weighed averaged parameter values to then determine threshold segmentation values for segmenting users into the user segments.

Figure 8:
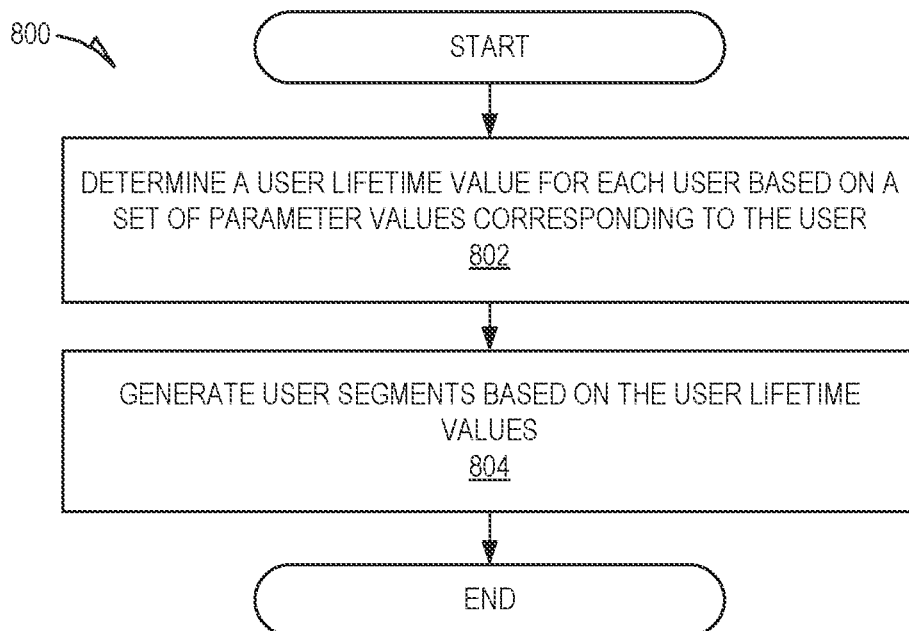
FIG. 8 is a flowchart showing a method for segmenting users based on user lifetime value, according to some example embodiments.

FIG. 8 is a flowchart showing a method 800 for segmenting users based on user lifetime value, according to some example embodiments. The method 800 may be embodied in computer readable instructions for execution by one or more processors such that the operations of the method 800 may be performed in part or in whole by the data segmentation system 108; accordingly, the method 800 is described below by way of example with reference thereto. However, it shall be appreciated that at least some of the operations of the method 800 may be deployed on various other hardware configurations and the method 800 is not intended to be limited to the data segmentation system 108.

At operation 802, the automated data segmentation component 206 determines a user lifetime value for each user based on a set of parameter values corresponding to the user. The automated data segmentation component 206 may calculate the user lifetime value using any of a variety of algorithms and/or using any of a variety of parameters.

At operation 804, the automated data segmentation component 206 generates user segments based on the user lifetime values. For example, the users may be segmented into categories indicating whether a user has a high lifetime value, medium lifetime value, or low lifetime value. The user segments may be used for engaging with users, generating analytics, and/or training segmentation models.

Figure 9:
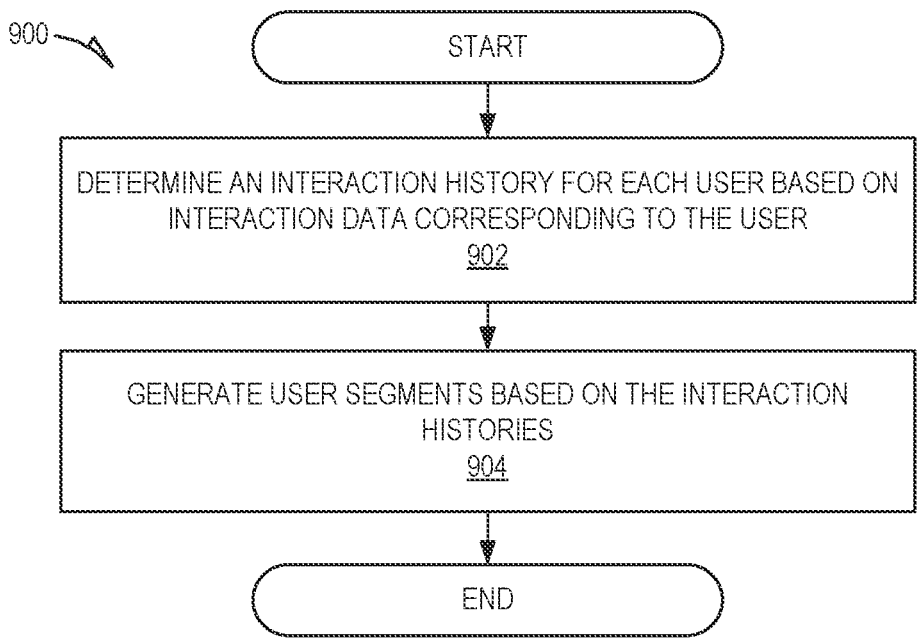
FIG. 9 is a flowchart showing a method for segmenting users based on user an interaction history, according to some example embodiments.

FIG. 9 is a flowchart showing a method 900 for segmenting users based on user an interaction history, according to some example embodiments. The method 900 may be embodied in computer readable instructions for execution by one or more processors such that the operations of the method 900 may be performed in part or in whole by the data segmentation system 108; accordingly, the method 900 is described below by way of example with reference thereto. However, it shall be appreciated that at least some of the operations of the method 900 may be deployed on various other hardware configurations and the method 900 is not intended to be limited to the data segmentation system 108.

At operation 902, the automated data segmentation component 206 determines an interaction history for each user based on interaction data corresponding to the user. The interaction history may indicate a listing of previous interactions performed by the user, such as visiting retail location, purchasing an item, visiting a website, and the like.

At operation 904, the automated data segmentation component 206 generates user segments based on the interaction histories. For example, the users may be segmented into categories indicating whether a user is a loyal customer, at-risk customer, or lost customer. As another example, the users may be segmented into categories indicating whether a user is trend setter or a trend follower. The user segments may be used for engaging with users, generating analytics, and/or training segmentation models.

Figure 10:
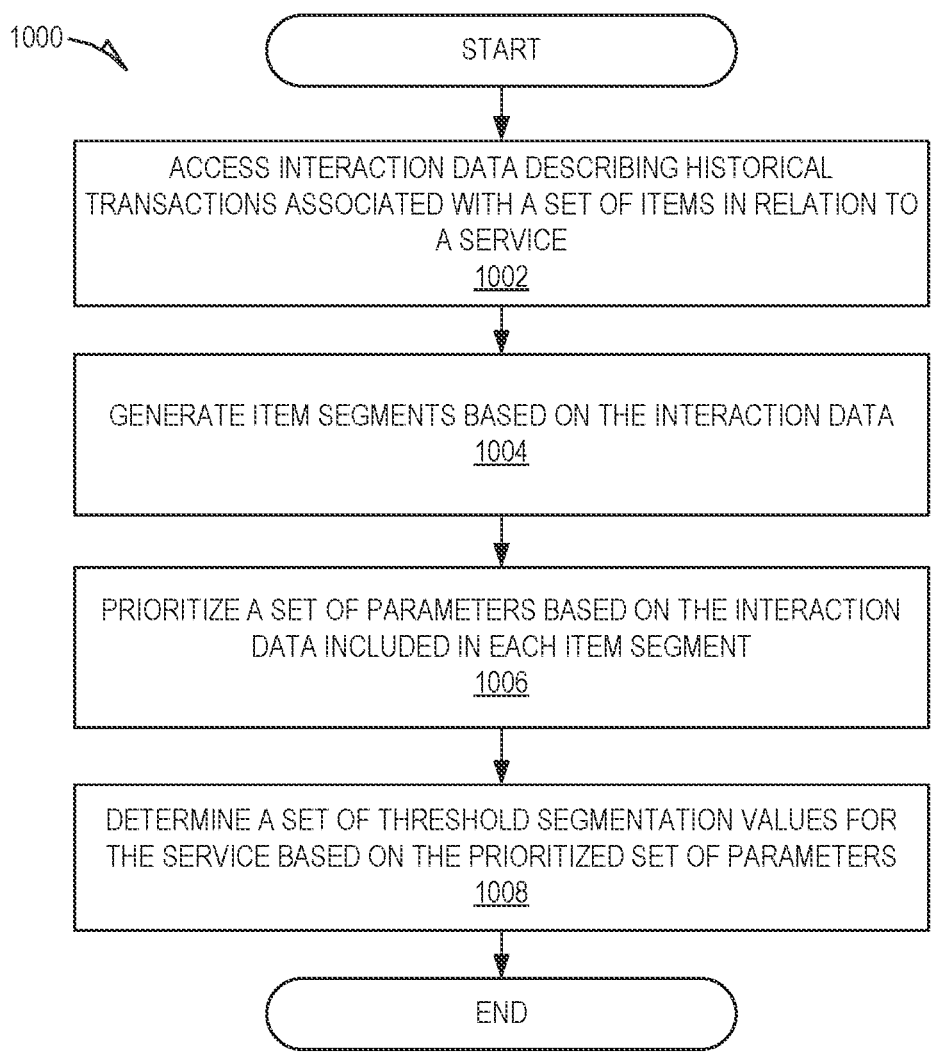
FIG. 10 is a flowchart showing a method for data segmentation of items using machine learning, according to some example embodiments.

FIG. 10 is a flowchart showing a method 1000 for data segmentation of items using machine learning, according to some example embodiments. The method 1000 may be embodied in computer readable instructions for execution by one or more processors such that the operations of the method 1000 may be performed in part or in whole by the data segmentation system 108; accordingly, the method 1000 is described below by way of example with reference thereto. However, it shall be appreciated that at least some of the operations of the method 1000 may be deployed on various other hardware configurations and the method 1000 is not intended to be limited to the data segmentation system 108.

At operation 1002, the data accessing component 202 accesses interaction data describing historical interactions associated with a se to of times in relation to a service. The data accessing component 202 accesses data from a service provider that provides the service. The service may include the service provider overall or a subset of the services provided by a service provider, such as a particular physical location (e.g., retail store) or channel associated with the service provider (e.g., online).

The accessed data may include any of a variety of types of data provided by the service provider to be segmented by the data segmentation system 108. The data accessing component 202 may access the data by receiving transmissions from a service provider system 106. As another example, the data accessing component 202 may periodically query the service provider system 106 for data.

The data accessed from the service provider system 106 may include data collected from various computing devices and locations. For example, the data may include data gathered by cloud-based servers of the service provider system 106 that facilitate a website and/or online service of the service provider. As another example, the data may include data gathered by computing devices included in the service provider system 106 that are implemented at physical locations associated with the service provider, such as point of sale (POS) systems, customer tracking systems, and the like.

The data may include any of a variety of types of data gathered by the service provider. For example, the data may include data describing the service provider's users, individual transactions (purchases, reservations, transfers), and/or any other type of user interactions with the service provider. Other types of interactions include use of the services providers website (e.g., page views, items added to cart, etc.), communications with the service provider's representatives and/or agents (e.g., support representatives, sales agents, etc.), visits to the service provider's physical locations (e.g., store visits), and the like. The data may also include data describing inventory items offered for sale by the service provider. For example, the data may include data identifying the inventory items (e.g., stock keeping unit (SKU) codes), a quantity of the inventory items, the location of the inventory items (e.g., retail store, warehouse, etc.), inventory item type (e.g., pants, shirt, etc.), description of the inventory items (e.g., color, size, etc.), and the like.

The data may be aggregated and/or normalized to describe individual users and/or individual inventory items. For example, data associated with each individual user and/or inventory item may be used to calculate a set of parameter values corresponding to a set of parameters for describing the individual user and/or inventory item. The parameters may include any parameter for describing a user or inventory item. For example, the set of parameters may include parameters that describe a user's interaction history with the service provider, such as an average cart size of the user, a frequency at which the user interacts with the service provider, a purchase history of the user, a recency of the user's latest interaction with the service provider, a user lifetime value (LTV), and the like. The parameters may also include data describing an inventory item, such as an item type, color, size, an average time to sale of the item, an average sale price at which the inventory item was purchased, an average expiration duration of the item, and the like. The parameter values may be calculated by the service provider system 106 prior to transmission of the data to the data segmentation system 108 and/or by the data segmentation system 108.

At operation 1004, the training data component 302 generates item segments based on the interaction data. The item segments each include a subset of the items and are used to train a segmentation model. The item segments may be generated based on categorizations determined by human reviewers and/or according to a predetermined set of criteria or rules. The item segments may each represent a predetermined category for segmenting the items.

At operation 1006, the parameter ranking component 304 prioritizes a set of parameter values based on the interaction data included in each item segment. The parameter ranking component 304 determines a prioritization and/or ranking of various parameters included in the data, such as parameters that describe a user and/or inventory item.

At operation 1008, the segmentation threshold calculation component 314 determines a set of threshold segmentation values for the service based on the prioritized set of parameter values. The threshold segmentation values define an upper and/or lower limit of a segmentation value range associated with each item segment. To calculate the threshold segmentation value, the segmentation threshold calculation component 314 calculates a set of averaged parameter values based on the individual sets of parameter values included in each item segment. The segmentation threshold calculation component 314 may then apply weights determined based on the ranking of the parameters to the averaged parameters value, resulting in a set of weighted averaged parameter values. The segmentation threshold calculation component 314 uses the weighed averaged parameter values to then determine threshold segmentation values for segmenting items into the item segments.

Figure 11:
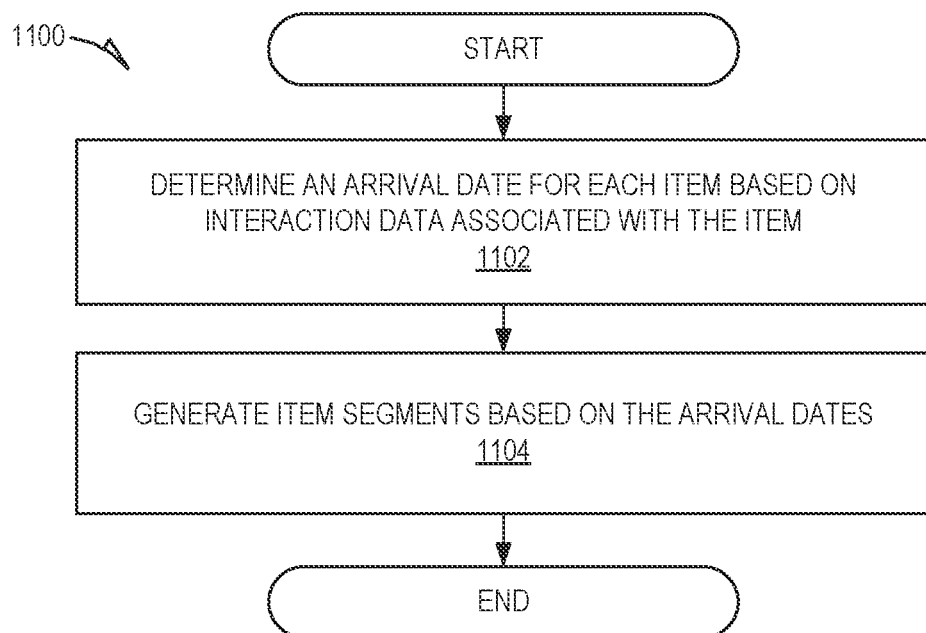
FIG. 11 is a flowchart showing a method for segmenting items based on an arrival, according to some example embodiments

FIG. 11 is a flowchart showing a 1100 method for segmenting items based on an arrival, according to some example embodiments. The method 1100 may be embodied in computer readable instructions for execution by one or more processors such that the operations of the method 1100 may be performed in part or in whole by the data segmentation system 108; accordingly, the method 1100 is described below by way of example with reference thereto. However, it shall be appreciated that at least some of the operations of the method 1100 may be deployed on various other hardware configurations and the method 1100 is not intended to be limited to the data segmentation system 108.

At operation 1102, the automated data segmentation component 206 determines an arrival date for each item based on interaction data associated with the item. The arrival date may indicate a date at which the inventory item was released, arrived at a retail location, was made available for sale, and the like.

At operation 1104, the automated data segmentation component 206 generates item segments based on the arrival dates. For example, the items may be segmented into categories indicating whether the item is a new item or older item. The item segments may be used for engaging with users, generating recommendations, generating analytics, and/or training segmentation models.

Figure 12:
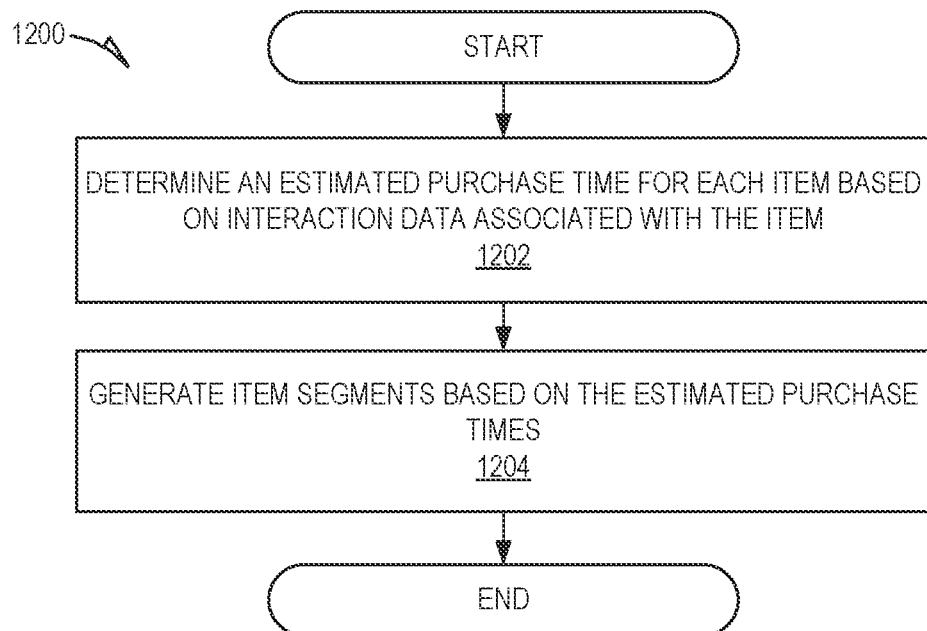
FIG. 12 is a flowchart showing a method for segmenting items based on estimated purchase times, according to some example embodiments.

FIG. 12 is a flowchart showing a method 1200 for segmenting items based on estimated purchase times, according to some example embodiments. The method 1200 may be embodied in computer readable instructions for execution by one or more processors such that the operations of the method 1200 may be performed in part or in whole by the data segmentation system 108; accordingly, the method 1200 is described below by way of example with reference thereto. However, it shall be appreciated that at least some of the operations of the method 1200 may be deployed on various other hardware configurations and the method 1200 is not intended to be limited to the data segmentation system 108.

At operation 1202, the automated data segmentation component 206 determines an estimated purchase time for each item based on interaction data associated with the item. The estimated purchase time may indicate an estimated amount of time for an item listed for sale to be purchased. The estimated purchase time may be determined based on an average sale time for the item, as determined from the interaction data.

At operation 1204, the automated data segmentation component 206 generates item segments based on the estimated purchase times. For example, the items may be segmented into categories indicating whether the item is a hot item that is expected to sell quickly or a slow mover. The item segments may be used for engaging with users, generating recommendations, generating analytics, and/or training segmentation models.

Figure 13:
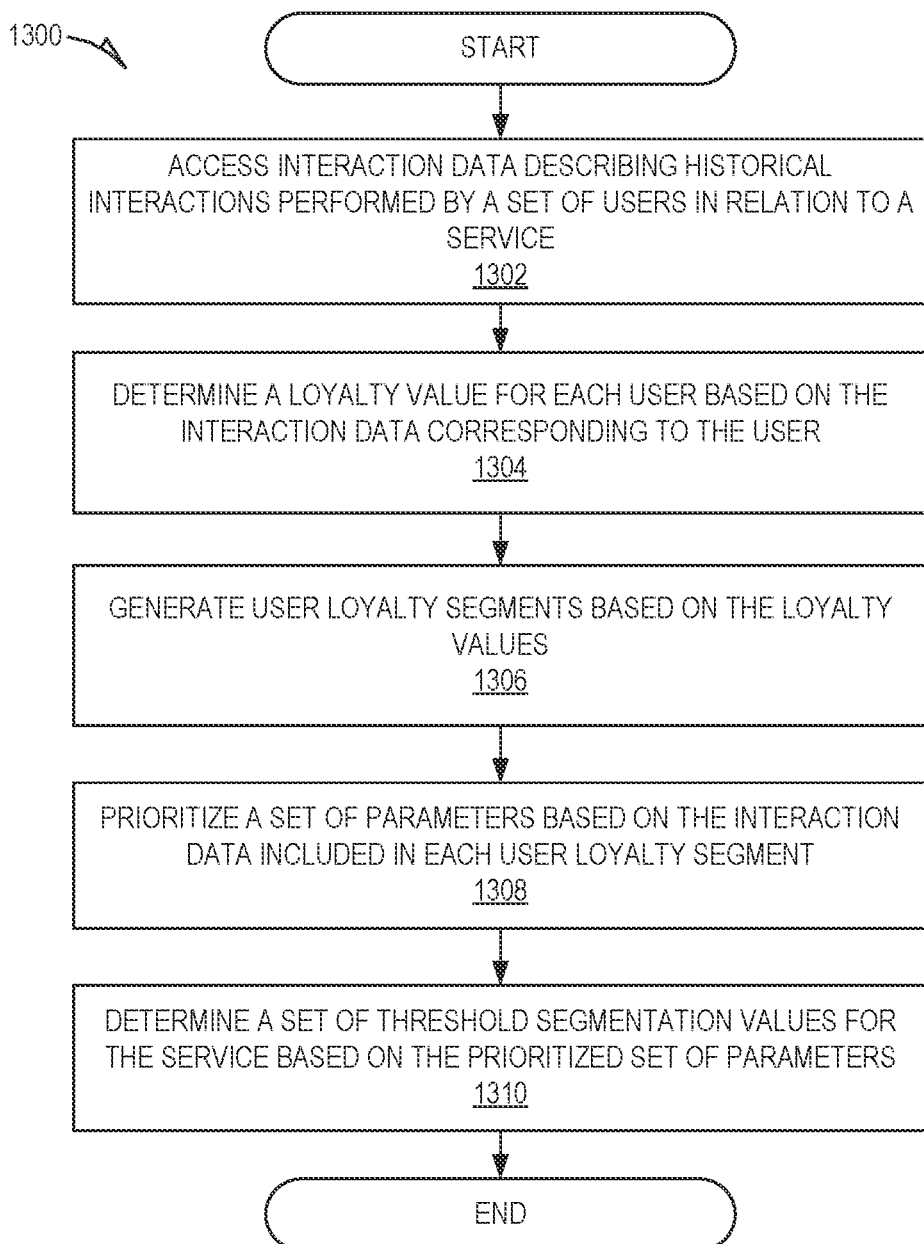
FIG. 13 is a flowchart showing a method for data segmentation of users based on loyalty value using machine learning, according to some example embodiments.

FIG. 13 is a flowchart showing a method 1300 for data segmentation of users based on loyalty value using machine learning, according to some example embodiments. The method 1300 may be embodied in computer readable instructions for execution by one or more processors such that the operations of the method 1300 may be performed in part or in whole by the data segmentation system 108; accordingly, the method 1300 is described below by way of example with reference thereto. However, it shall be appreciated that at least some of the operations of the method 1300 may be deployed on various other hardware configurations and the method 1300 is not intended to be limited to the data segmentation system 108.

At operation 1302, the data accessing component 202 accesses interaction data describing historical interactions performed by a set of users in relation to a service. The data accessing component 202 accesses data from a service provider that provides the service. The service may include the service provider overall or a subset of the services provided by a service provider, such as a particular physical location (e.g., retail store) or channel associated with the service provider (e.g., online).

The accessed data may include any of a variety of types of data provided by the service provider to be segmented by the data segmentation system 108. The data accessing component 202 may access the data by receiving transmissions from a service provider system 106. As another example, the data accessing component 202 may periodically query the service provider system 106 for data.

The data accessed from the service provider system 106 may include data collected from various computing devices and locations. For example, the data may include data gathered by cloud-based servers of the service provider system 106 that facilitate a website and/or online service of the service provider. As another example, the data may include data gathered by computing devices included in the service provider system 106 that are implemented at physical locations associated with the service provider, such as point of sale (POS) systems, customer tracking systems, and the like.

The data may include any of a variety of types of data gathered by the service provider. For example, the data may include data describing the service provider's users, individual transactions (purchases, reservations, transfers), and/or any other type of user interactions with the service provider. Other types of interactions include use of the services providers website (e.g., page views, items added to cart, etc.), communications with the service provider's representatives and/or agents (e.g., support representatives, sales agents, etc.), visits to the service provider's physical locations (e.g., store visits), and the like. The data may also include data describing inventory items offered for sale by the service provider. For example, the data may include data identifying the inventory items (e.g., stock keeping unit (SKU) codes), a quantity of the inventory items, the location of the inventory items (e.g., retail store, warehouse, etc.), inventory item type (e.g., pants, shirt, etc.), description of the inventory items (e.g., color, size, etc.), and the like.

The data may be aggregated and/or normalized to describe individual users and/or individual inventory items. For example, data associated with each individual user and/or inventory item may be used to calculate a set of parameter values corresponding to a set of parameters for describing the individual user and/or inventory item. The parameters may include any parameter for describing a user or inventory item. For example, the set of parameters may include parameters that describe a user's interaction history with the service provider, such as an average cart size of the user, a frequency at which the user interacts with the service provider, a purchase history of the user, a recency of the user's latest interaction with the service provider, a user lifetime value (LTV), and the like. The parameters may also include data describing an inventory item, such as an item type, color, size, an average time to sale of the item, an average sale price at which the inventory item was purchased, an average expiration duration of the item, and the like. The parameter values may be calculated by the service provider system 106 prior to transmission of the data to the data segmentation system 108 and/or by the data segmentation system 108.

At operation 1304, the training data component 302 determines a loyalty value for each user based on the interaction data corresponding to the user. The loyalty value may indicate the loyalty level of a user in relation to a service and/or service provider. The loyalty value may be determined based on a variety of parameters and factors, such as a lifetime value, average cart size, average purchase price, frequency value, and the like.

At operation 1306, the training data component 302 generates user loyalty segments based on the loyalty values. For example, the users may be segmented into loyalty segments indicating whether the user is a loyal customer, at risk customer, lost customer, and the like.

At operation 1308, the parameter ranking component 304 prioritizes a set of parameters based on the interaction data included in each user loyalty segment. For example, the parameter ranking component 304 may prioritize the set of parameters included in each user loyalty segment and/or used to determine the loyalty values for the users.

At operation 1310, the segmentation threshold calculation component 314 determines a set of threshold segmentation values for the service based on the prioritized set of parameters. The threshold segmentation values define an upper and/or lower limit of a segmentation value range associated with each user loyalty segment. To calculate the threshold segmentation value, the segmentation threshold calculation component 314 calculates a set of averaged parameter values based on the individual sets of parameter values included in each user loyalty segment. The segmentation threshold calculation component 314 may then apply weights determined based on the ranking of the parameters to the averaged parameters value, resulting in a set of weighted averaged parameter values. The segmentation threshold calculation component 314 uses the weighed averaged parameter values to then determine threshold segmentation values for segmenting users into the user loyalty segments.

Figure 14:
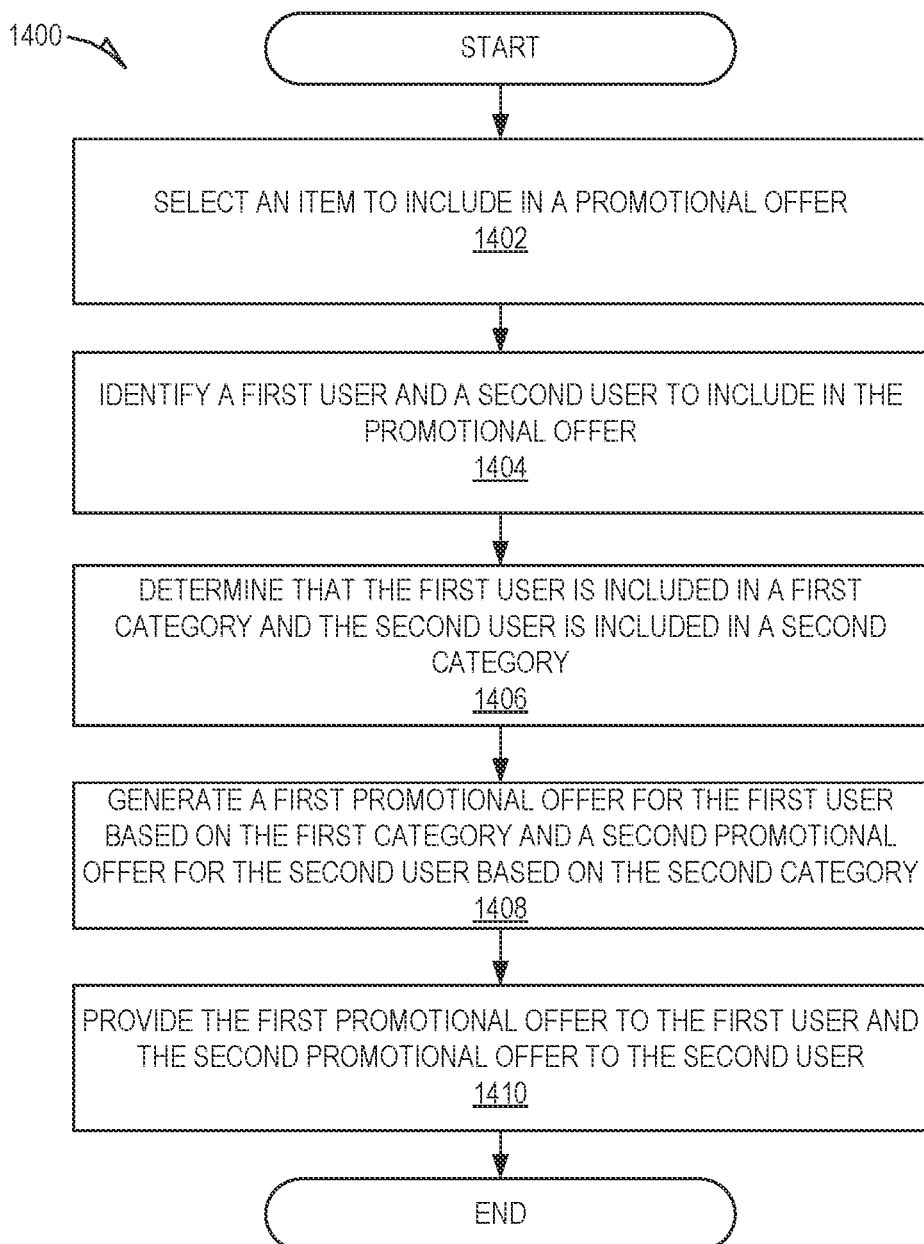
FIG. 14 is a flowchart showing a method for providing personalized promotions based on user segments, according to some example embodiments.

FIG. 14 is a flowchart showing a method for providing personalized promotions based on user segments, according to some example embodiments. The method 1400 may be embodied in computer readable instructions for execution by one or more processors such that the operations of the method 1400 may be performed in part or in whole by the data segmentation system 108; accordingly, the method 1400 is described below by way of example with reference thereto. However, it shall be appreciated that at least some of the operations of the method 1400 may be deployed on various other hardware configurations and the method 1400 is not intended to be limited to the data segmentation system 108.

At operation 1402, the engagement management component 210 selects an item to include in a promotional offer. The engagement management component 210 may select the item based on interaction data associated with a service. For example, the engagement management component 210 may select the item based on determining that the item is nearing an expiration data of the item.

At operation 1404, the engagement management component 210 identifies a first user and a second user to include in the promotional offer. For example, the engagement management component 210 may identify the users based on a determined affinity between the users and the item and/or a determined affinity between segmentation of the users and the item.

At operation 1406, the engagement management component 210 determines that the first user is included in a first category and the second user is included in a second category. The users may be categorized based on a variety of factors, such as the types of customer, loyalty level of the customers, and the like. In some embodiments, the categorization may indicate the type of shopper that a customer is, such as a trend setter, a value shopper, and the like.

At operation 1408, the engagement management component 210 generates a first promotional offer for the first user based on the first category and a second promotional offer for the second user based on the second category. The promotional offers generated for the users may be personalized based on the categorization of the user. For example, a user categorized as a trend setter may be provided with a promotion including early access for purchasing an item, whereas a value shopper may be provided with a promotion offering a discounted price for the item. As another example, the size of a discount may be based on the categorization of the users.

At operation 1410, the engagement management component 210 provides the first promotional offer to the first user and the second promotional offer to the second user.

Figure 15:
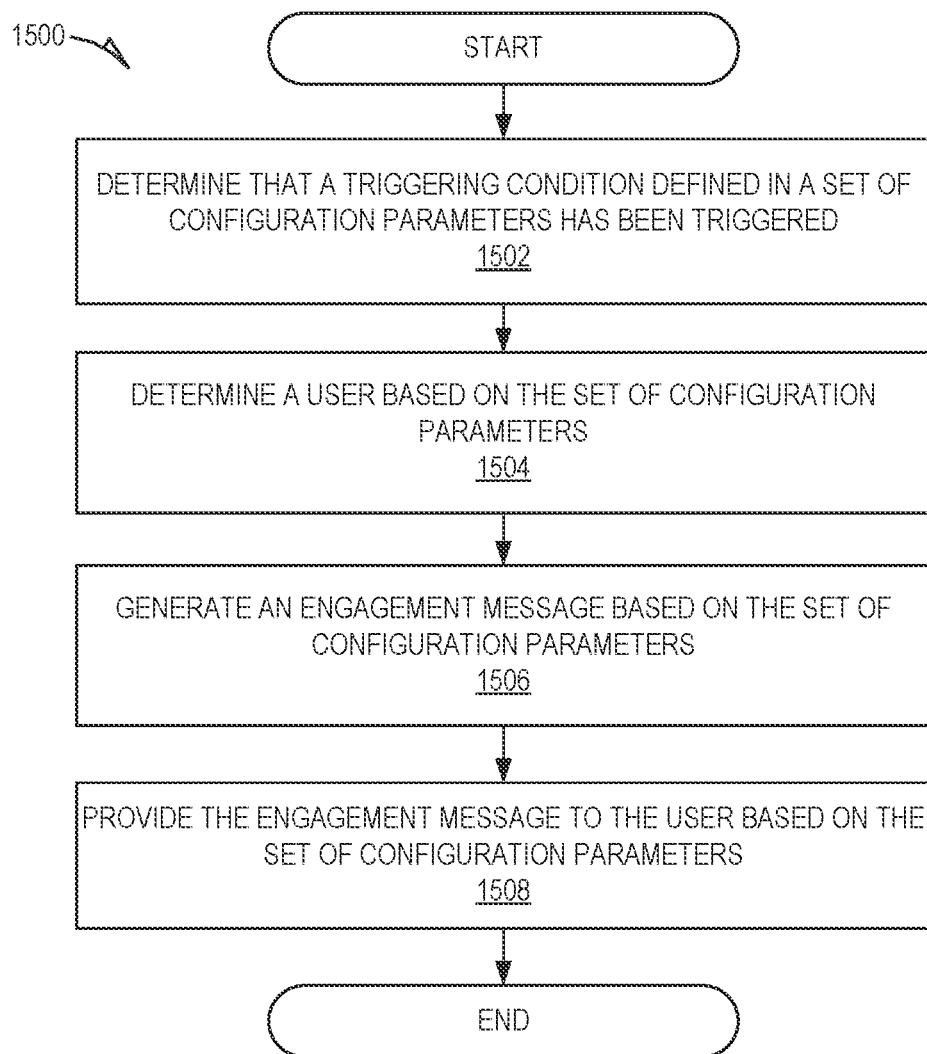
FIG. 15 is a flowchart showing a method for providing personalized engagement based on configuration parameters, according to some example embodiments

FIG. 15 is a flowchart showing a method for providing personalized engagement based on configuration parameters, according to some example embodiments. The method 1500 may be embodied in computer readable instructions for execution by one or more processors such that the operations of the method 1500 may be performed in part or in whole by the data segmentation system 108; accordingly, the method 1500 is described below by way of example with reference thereto. However, it shall be appreciated that at least some of the operations of the method 1500 may be deployed on various other hardware configurations and the method 1500 is not intended to be limited to the data segmentation system 108.

At operation 1502, the engagement management component 210 determines that a triggering condition defined in a set of configuration parameters has been triggered. A triggering condition is one or more conditions that, if met, causes performance of a specified engagement. For example, the engagement may be transmitting a message and/or promotion to a user, sending a recommendation to a user, and the like.

The triggering conditions may include any type of conditions. For example, a triggering condition may be detecting a change in the segmentation of a user, such as detecting a change in the segmentation of a user a loyal customer to an at-risk customer. As another example, a triggering condition may be based on detecting a change in segmentation of an item, such as an item changing segmentation from a hot item to a slow mover. As another example, a triggering condition may be based on a remaining time until an expiration date of an item, such as an item being within one week of expiring. These are just some examples of triggering conditions and are not meant to be limiting. The configuration parameters may utilize any of a variety of type and combinations of triggering conditions.

At operation 1504, the engagement management component 210 determines a user based on the set of configuration parameters. The configurations may identify rules for selecting users to received promotions when a triggering condition has been satisfied. In some embodiments, the rules may identify a specific segmentation or segmentations of users to receive an engagement. For example, a rule may identify that users segmented as value shoppers to receive a promotion for an item that is nearing its expiration date. As another example, a rule may identify that users determined to have an affinity for item se receive a promotion for the item when a specified triggering condition is satisfied.

At operation 1506, the engagement management component 210 generates an engagement message based on the set of configuration parameters. The engagement message may be a message, a promotional offer, an item recommendation, and the like. The set of configuration parameters may define the type of engagement message to transmit when a triggering condition has been satisfied. Further, the set of configuration parameters may define constraints on the engagement message, such as constraints on the types or extent of promotions that may be provided to a user. For example, the promotions may include a maximum discounted amount or percentage that may be offered to a user as a promotion. As another example, the constraints may identify a constraint on a number of users that may receive the promotions.

At operation 1508, the engagement management component 210 provides the engagement message to the user based on the set of configuration parameters. For example, the engagement message may be sent as an email, text message, SMS, and the like.

Figure 16:
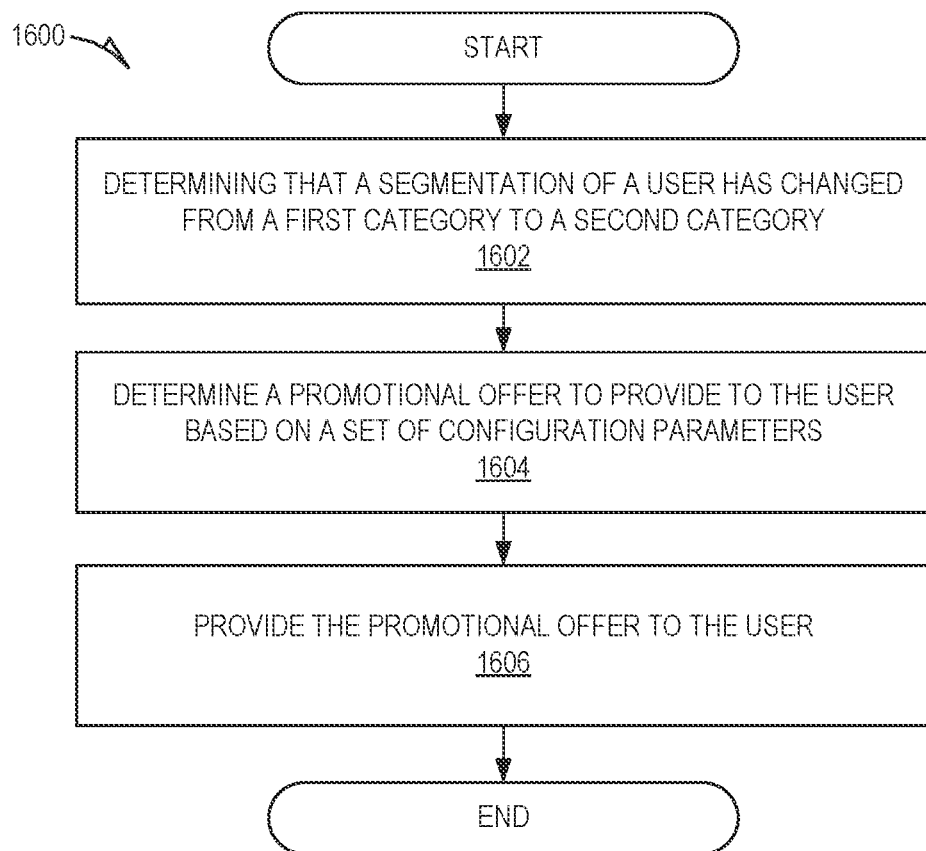
FIG. 16 is a flowchart showing a method for determining that a triggering condition has been satisfied, according to some example, embodiments.

FIG. 16 is a flowchart showing a method for determining that a triggering condition has been satisfied, according to some example embodiments. The method 1600 may be embodied in computer readable instructions for execution by one or more processors such that the operations of the method 1600 may be performed in part or in whole by the data segmentation system 108; accordingly, the method 1600 is described below by way of example with reference thereto. However, it shall be appreciated that at least some of the operations of the method 1600 may be deployed on various other hardware configurations and the method 1600 is not intended to be limited to the data segmentation system 108.

At operation 1602, the engagement management component 210 determines that a segmentation of a user has changed from a first category to a second category. For example, the user's segmentation may have changed from a user a loyal customer to an at-risk customer At operation 1604, the engagement management component 210 determines a promotional offer to provide to the user based on the set of configuration parameters. For example, the configuration parameters may define the type of promotion to provide the user and/or the type of promotion to provide based on a segmentation of the user. As an example, a user that is a trend setter may be provided with a recommendation to purchase a newly released item. As another example, a user that is determined to be an at-risk customer may be provided with a promotional offer to in an effort to retain the user and/or turn the user from an at-risk customer into a loyal customer. As another example, a user that is a trend setter may be provided with a promotion to receive early access to a newly released item, whereas a user that is cost conscious may be provided with a promotion offering a discount to purchase the item.

At operation 1606, the engagement management component 210 provides the promotional offer to the user. For example, the engagement message may be sent as an email, text message, SMS, and the like.

Software Architecture

Figure 17:
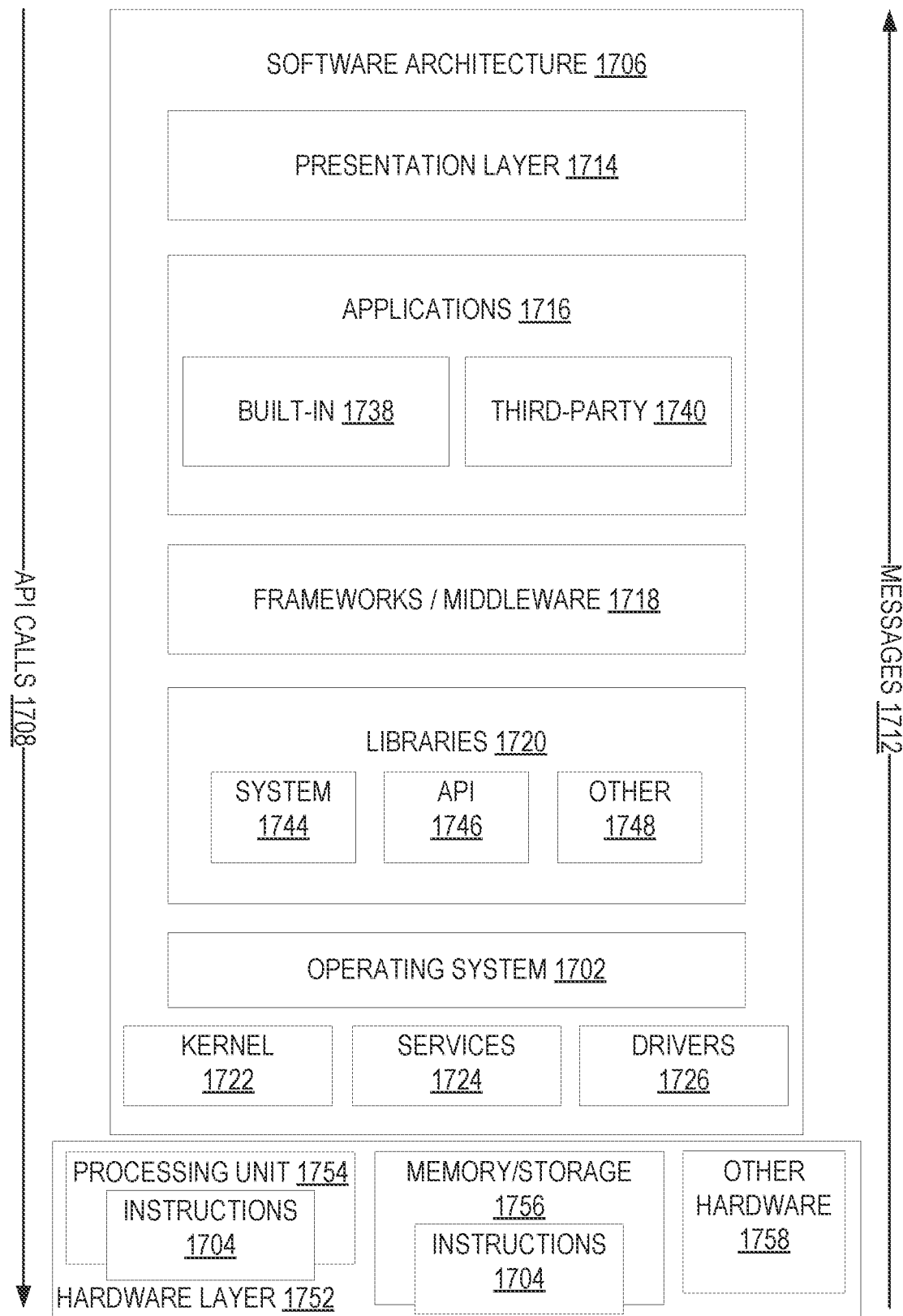
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating an example software architecture 1706, which may be used in conjunction with various hardware architectures herein described. FIG. 17 is a non-limiting example of a software architecture 1706 and it will be appreciated that many other architectures may be implemented to facilitate the functionality described herein. The software architecture 1706 may execute on hardware such as machine 1800 of FIG. 18 that includes, among other things, processors 1804, memory 1814, and (input/output) I/O components 1818. A representative hardware layer 1752 is illustrated and can represent, for example, the machine 1800 of FIG. 18. The representative hardware layer 1752 includes a processing unit 1754 having associated executable instructions 1704. Executable instructions 1704 represent the executable instructions of the software architecture 1706, including implementation of the methods, components, and so forth described herein. The hardware layer 1752 also includes memory and/or storage modules 1756, which also have executable instructions 1704. The hardware layer 1752 may also comprise other hardware 1758.

In the example architecture of FIG. 17, the software architecture 1706 may be conceptualized as a stack of layers where each layer provides particular functionality. For example, the software architecture 1706 may include layers such as an operating system 1702, libraries 1720, frameworks/middleware 1718, applications 1716, and a presentation layer 1714. Operationally, the applications 1716 and/or other components within the layers may invoke application programming interface (API) calls 1708 through the software stack and receive a response such as messages 1712 in response to the API calls 1708. The layers illustrated are representative in nature and not all software architectures have all layers. For example, some mobile or special purpose operating systems may not provide a frameworks/middleware 1718, while others may provide such a layer. Other software architectures may include additional or different layers.

The operating system 1702 may manage hardware resources and provide common services. The operating system 1702 may include, for example, a kernel 1722, services 1724, and drivers 1726. The kernel 1722 may act as an abstraction layer between the hardware and the other software layers. For example, the kernel 1722 may be responsible for memory management, processor management (e.g., scheduling), component management, networking, security settings, and so on. The services 1724 may provide other common services for the other software layers. The drivers 1726 are responsible for controlling or interfacing with the underlying hardware. For instance, the drivers 1726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1720 provide a common infrastructure that is used by the applications 1716 and/or other components and/or layers. The libraries 1720 provide functionality that allows other software components to perform tasks in an easier fashion than to interface directly with the underlying operating system 1702 functionality (e.g., kernel 1722, services 1724, and/or drivers 1726). The libraries 1720 may include system libraries 1744 (e.g., C standard library) that may provide functions such as memory allocation functions, string manipulation functions, mathematical functions, and the like. In addition, the libraries 1720 may include API libraries 1746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1720 may also include a wide variety of other libraries 1748 to provide many other APIs to the applications 1716 and other software components/modules.

The frameworks/middleware 1718 (also sometimes referred to as middleware) provide a higher-level common infrastructure that may be used by the applications 1716 and/or other software components/modules. For example, the frameworks/middleware 1718 may provide various graphical user interface (GUI) functions, high-level resource management, high-level location services, and so forth. The frameworks/middleware 1718 may provide a broad spectrum of other APIs that may be used by the applications 1716 and/or other software components/modules, some of which may be specific to a particular operating system 1702 or platform.

The applications 1716 include built-in applications 1738 and/or third-party applications 1740. Examples of representative built-in applications 1738 may include, but are not limited to, a contacts application, a browser application, a book reader application, a location application, a media application, a messaging application, and/or a game application. Third-party applications 1740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1740 may invoke the API calls 1708 provided by the mobile operating system (such as operating system 1702) to facilitate functionality described herein.

The applications 1716 may use built in operating system functions (e.g., kernel 1722, services 1724, and/or drivers 1726), libraries 1720, and frameworks/middleware 1718 to create UIs to interact with users of the system. Alternatively, or additionally, in some systems, interactions with a user may occur through a presentation layer, such as presentation layer 1714. In these systems, the application/component "logic" can be separated from the aspects of the application/component that interact with a user.

Figure 18:
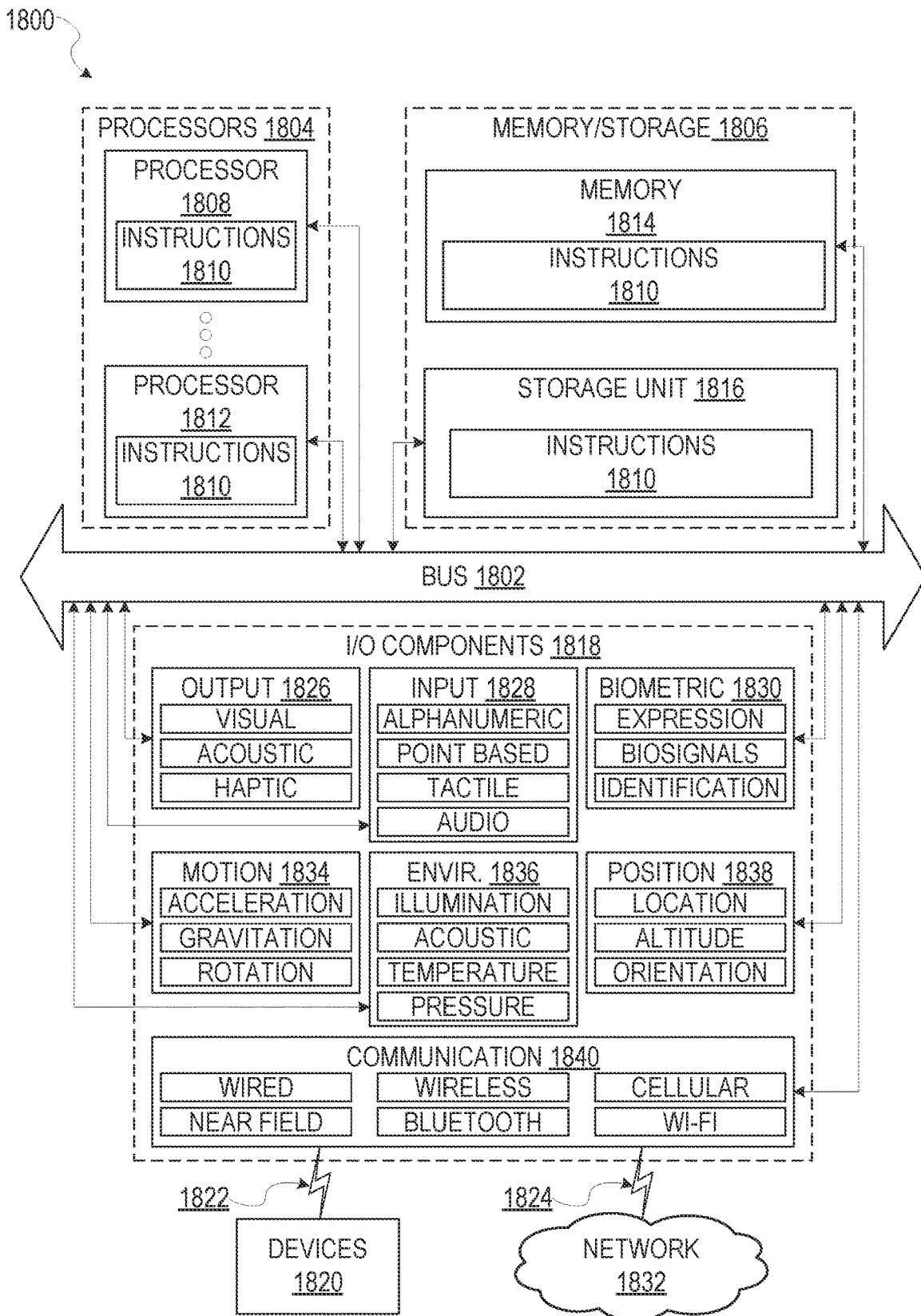
FIG. 18 is a block diagram illustrating components of a machine, according to some example embodiments, able to read instructions from a machine-readable medium (e.g., a machine-readable storage medium) and perform any one or more of the methodologies discussed herein.

FIG. 18 is a block diagram illustrating components of a machine 1800, according to some example embodiments, able to read instructions 1704 from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1810 (e.g., software, a program, an application, an applet, an app, or other executable code) for causing the machine 1800 to perform any one or more of the methodologies discussed herein may be executed. As such, the instructions 1810 may be used to implement modules or components described herein. The instructions 1810 transform the general, non-programmed machine 1800 into a particular machine 1800 programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1800 capable of executing the instructions 1810, sequentially or otherwise, that specify actions to be taken by machine 1800. Further, while only a single machine 1800 is illustrated, the term "machine" shall also be taken to include a collection of machines that individually or jointly execute the instructions 1810 to perform any one or more of the methodologies discussed herein.

The machine 1800 may include processors 1804, memory/storage 1806, and I/O components 1818, which may be configured to communicate with each other such as via a bus 1802. The memory/storage 1806 may include a memory 1814, such as a main memory, or other memory storage, and a storage unit 1816, both accessible to the processors 1804 such as via the bus 1802. The storage unit 1816 and memory 1814 store the instructions 1810 embodying any one or more of the methodologies or functions described herein. The instructions 1810 may also reside, completely or partially, within the memory 1814, within the storage unit 1816, within at least one of the processors 1804 (e.g., within the processor's cache memory), or any suitable combination thereof, during execution thereof by the machine 1800. Accordingly, the memory 1814, the storage unit 1816, and the memory of processors 1804 are examples of machine-readable media.

The I/O components 1818 may include a wide variety of components to receive input, provide output, produce output, transmit information, exchange information, capture measurements, and so on. The specific I/O components 1818 that are included in a particular machine 1800 will depend on the type of machine. For example, portable machines such as mobile phones will likely include a touch input device or other such input mechanisms, while a headless server machine will likely not include such a touch input device. It will be appreciated that the I/O components 1818 may include many other components that are not shown in FIG. 18. The I/O components 1818 are grouped according to functionality merely for simplifying the following discussion and the grouping is in no way limiting. In various example embodiments, the I/O components 1818 may include output components 1826 and input components 1828. The output components 1826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1818 may include biometric components 1830, motion components 1834, environmental components 1836, or position components 1838 among a wide array of other components. For example, the biometric components 1830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1834 may include acceleration sensor components (e.g., accelerometer), gravitation sensor components, rotation sensor components (e.g., gyroscope), and so forth. The environmental components 1836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1818 may include communication components 1840 operable to couple the machine 1800 to a network 1832 or devices 1820 via coupling 1824 and coupling 1822, respectively. For example, the communication components 1840 may include a network interface component or other suitable device to interface with the network 1832. In further examples, communication components 1840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1820 may be another machine or any of a wide variety of peripheral devices (e.g., a peripheral device coupled via a USB).

Moreover, the communication components 1840 may detect identifiers or include components operable to detect identifiers. For example, the communication components 1840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1810 for execution by the machine 1800, and includes digital or analog communications signals or other intangible medium to facilitate communication of such instructions 1810. Instructions 1810 may be transmitted or received over the network 1832 using a transmission medium via a network interface device and using any one of a number of well-known transfer protocols.

"CLIENT DEVICE" in this context refers to any machine 1800 that interfaces to a communications network 1832 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1832.

"COMMUNICATIONS NETWORK" in this context refers to one or more portions of a network 1832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1832 or a portion of a network 1832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1810. The term "machine-readable medium" shall also be taken to include any medium, or combination of multiple media, that is capable of storing instructions 1810 (e.g., code) for execution by a machine 1800, such that the instructions 1810, when executed by one or more processors 1804 of the machine 1800, cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1804) may be configured by software (e.g., an application 1716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1804 or other programmable processor 1804. Once configured by such software, hardware components become specific machines 1800 (or specific components of a machine 1800) uniquely tailored to perform the configured functions and are no longer general-purpose processors 1804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1804 configured by software to become a special-purpose processor, the general-purpose processor 1804 may be configured as respectively different special-purpose processors (e.g., comprising different hardware components) at different times. Software accordingly configures a particular processor or processors 1804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1804 that are temporarily configured (e.g., by software) or permanently configured to perform the relevant operations. Whether temporarily or permanently configured, such processors 1804 may constitute processor-implemented components that operate to perform one or more operations or functions described herein. As used herein, "processor-implemented component" refers to a hardware component implemented using one or more processors 1804. Similarly, the methods described herein may be at least partially processor-implemented, with a particular processor or processors 1804 being an example of hardware. For example, at least some of the operations of a method may be performed by one or more processors 1804 or processor-implemented components. Moreover, the one or more processors 1804 may also operate to support performance of the relevant operations in a "cloud computing" environment or as a "software as a service" (SaaS). For example, at least some of the operations may be performed by a group of computers (as examples of machines 1800 including processors 1804), with these operations being accessible via a network 1832 (e.g., the Internet) and via one or more appropriate interfaces (e.g., an API). The performance of certain of the operations may be distributed among the processors 1804, not only residing within a single machine 1800, but deployed across a number of machines 1800. In some example embodiments, the processors 1804 or processor-implemented components may be located in a single geographic location (e.g., within a home environment, an office environment, or a server farm). In other example embodiments, the processors 1804 or processor-implemented components may be distributed across a number of geographic locations.

"PROCESSOR" in this context refers to any circuit or virtual circuit (a physical circuit emulated by logic executing on an actual processor 1804) that manipulates data values according to control signals (e.g., "commands," "op codes," "machine code," etc.) and which produces corresponding output signals that are applied to operate a machine 1800. A processor 1804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1804 may further be a multi-core processor having two or more independent processors 1804 (sometimes referred to as "cores") that may execute instructions 1810 contemporaneously.

What is claimed is:

1. A method comprising:
   accessing interaction data describing historical interactions performed by a set of users in relation to a first service, the interaction data including a respective set of parameter values corresponding to each user from the set of users, each respective set of parameter values including one or more individual parameter values for a set of parameters;
   generating, based on the interaction data, a first user segment including a first subset of the set of users and a second user segment including a second subset of the set of users;
   prioritizing the set of parameters based on the interaction data and membership of the set of users in the first user segment and the second user segment, yielding a prioritized set of parameters for the first service;
   determining a set of threshold segmentation values for the first service based on the respective set of parameter values corresponding to each user from the set of users and the prioritized set of parameters for the first service;

accessing a first set of parameter values corresponding to a first user that is not included in the set of users;

calculating a first segmentation value based on the first set of parameter values and the prioritized set of parameters for the first service; and categorizing the first user into a first category based on the first segmentation value and the set of threshold segmentation values for the first service.

2. The method of claim 1, further comprising:

calculating a second segmentation value based on the first set of parameter values and a second prioritized set of parameters for a second service; and categorizing the first user into a second category based on the second segmentation value and a set of threshold segmentation values for the second service.

3. The method of claim 1, wherein determining the first user segment and the second user segment comprises:

determining a user lifetime value (LTV) for each respective user based on the respective set of parameter values corresponding to the respective user, yielding a set of user LTVs; and generating the first user segment and the second user segment based on the set of user LTVs.

4. The method of claim 1, wherein determining the first user segment and the second user segment comprises:

determining an interaction history for each respective user based on the interaction data, yielding a set of interaction histories, the interaction history for each respective user indicating times at which the respective user interacted with the first service; and generating the first user segment and the second user segment based on the set of interaction histories.

5. The method of claim 1, wherein determining the set of threshold segmentation values for the first service comprises:

determining, based on the respective set of parameter values corresponding to the first subset of the set of users in the first user segment, a first set of averaged parameter values corresponding to the set of parameters;

determining, based on the respective set of parameter values corresponding to the second subset of the set of users in the second user segment, a second set of averaged parameter values corresponding to the set of parameters;

applying weights to the first set of averaged parameter values and the second set of averaged parameter values based on the prioritized set of parameters for the first service, yielding a first set of weighted averaged parameter values and a second set of weighted averaged parameter values;

determining a first threshold segmentation value based on the first set of weighted averaged parameter values; and determining a second threshold segmentation value based on the second set of weighted averaged parameter values.

6. The method of claim 5, wherein prioritizing the set of parameters comprises:

performing a linear regression based on sets of parameter values included in the first user segment and the second user segment, yielding a set of signal strength scores for the set of parameters; and ranking the set of parameters based on the set of signal strength scores.

7. A system comprising:

one or more computer processors; and one or more computer-readable mediums storing instructions that, when executed by the one or more computer processors, cause the system to perform operations comprising:

accessing interaction data describing historical interactions performed by a set of users in relation to a first service, the interaction data including a respective set of parameter values corresponding to each user from the set of users, each respective set of parameter values including one or more individual parameter values for a set of parameters;

generating, based on the interaction data, a first user segment including a first subset of the set of users and a second user segment including a second subset of the set of users;

prioritizing the set of parameters based on the interaction data and membership of the set of users in the first user segment and the second user segment, yielding a prioritized set of parameters for the first service;

determining a set of threshold segmentation values for the first service based on the respective set of parameter values corresponding to each user from the set of users and the prioritized set of parameters for the first service;

accessing a first set of parameter values corresponding to a first user that is not included in the set of users;

calculating a first segmentation value based on the first set of parameter values and the prioritized set of parameters for the first service; and categorizing the first user into a first category based on the first segmentation value and the set of threshold segmentation values for the first service.

8. The system of claim 7, the operations further comprising:

calculating a second segmentation value based on the first set of parameter values and a second prioritized set of parameters for a second service; and categorizing the first user into a second category based on the second segmentation value and a set of threshold segmentation values for the second service.

9. The system of claim 7, wherein determining the first user segment and the second user segment comprises:

determining a user lifetime value (LTV) for each respective user based on the respective set of parameter values corresponding to the respective user, yielding a set of user LTVs; and generating the first user segment and the second user segment based on the set of user LTVs.

10. The system of claim 7, wherein determining the first user segment and the second user segment comprises:

determining an interaction history for each respective user based on the interaction data, yielding a set of interaction histories, the interaction history for each respective user indicating times at which the respective user interacted with the first service; and generating the first user segment and the second user segment based on the set of interaction histories.

11. The system of claim 7, wherein determining the set of threshold segmentation values for the first service comprises:

determining, based on the respective set of parameter values corresponding to the first subset of the set of users in the first user segment, a first set of averaged parameter values corresponding to the set of parameters;

determining, based on the respective set of parameter values corresponding to the second subset of the set of users in the second user segment, a second set of averaged parameter values corresponding to the set of parameters;

applying weights to the first set of averaged parameter values and the second set of averaged parameter values based on the prioritized set of parameters for the first service, yielding a first set of weighted averaged parameter values and a second set of weighted averaged parameter values;

determining a first threshold segmentation value based on the first set of weighted averaged parameter values; and determining a second threshold segmentation value based on the second set of weighted averaged parameter values.

12. The system of claim 11, wherein prioritizing the set of parameters comprises:

performing a linear regression based on sets of parameter values included in the first user segment and the second user segment, yielding a set of signal strength scores for the set of parameters; and ranking the set of parameters based on the set of signal strength scores.

13. A non-transitory computer-readable medium storing instructions that, when executed by one or more computer processors of one or more computing devices, cause the one or more computing devices to perform operations comprising:

accessing interaction data describing historical interactions performed by a set of users in relation to a first service, the interaction data including a respective set of parameter values corresponding to each user from the set of users, each respective set of parameter values including one or more individual parameter values for a set of parameters;

generating, based on the interaction data, a first user segment including a first subset of the set of users and a second user segment including a second subset of the set of users;

prioritizing the set of parameters based on the interaction data and membership of the set of users in the first user segment and the second user segment, yielding a prioritized set of parameters for the first service;

determining a set of threshold segmentation values for the first service based on the respective set of parameter values corresponding to each user from the set of users and the prioritized set of parameters for the first service;

accessing a first set of parameter values corresponding to a first user that is not included in the set of users;

calculating a first segmentation value based on the first set of parameter values and the prioritized set of parameters for the first service; and categorizing the first user into a first category based on the first segmentation value and the set of threshold segmentation values for the first service.

14. The non-transitory computer-readable medium of claim 13, the operations further comprising:

calculating a second segmentation value based on the first set of parameter values and a second prioritized set of parameters for a second service; and categorizing the first user into a second category based on the second segmentation value and a set of threshold segmentation values for the second service.

15. The non-transitory computer-readable medium of claim 13, wherein determining the first user segment and the second user segment comprises:

determining a user lifetime value (LTV) for each respective user based on the respective set of parameter values corresponding to the respective user, yielding a set of user LTVs; and generating the first user segment and the second user segment based on the set of user LTVs.

16. The non-transitory computer-readable medium of claim 13, wherein determining the first user segment and the second user segment comprises:

determining an interaction history for each respective user based on the interaction data, yielding a set of interaction histories, the interaction history for each respective user indicating times at which the respective user interacted with the first service; and generating the first user segment and the second user segment based on the set of interaction histories.

17. The non-transitory computer-readable medium of claim 13, wherein determining the set of threshold segmentation values for the first service comprises:

determining, based on the respective set of parameter values corresponding to the first subset of the set of users in the first user segment, a first set of averaged parameter values corresponding to the set of parameters;

determining, based on the respective set of parameter values corresponding to the second subset of the set of users in the second user segment, a second set of averaged parameter values corresponding to the set of parameters;

applying weights to the first set of averaged parameter values and the second set of averaged parameter values based on the prioritized set of parameters for the first service, yielding a first set of weighted averaged parameter values and a second set of weighted averaged parameter values;

determining a first threshold segmentation value based on the first set of weighted averaged parameter values; and determining a second threshold segmentation value based on the second set of weighted averaged parameter values.

* * * * *